(12) United States Patent
Tabata et al.

(10) Patent No.: US 7,063,458 B1
(45) Date of Patent: Jun. 20, 2006

(54) EAR TYPE CLINICAL THERMOMETER

(75) Inventors: Makoto Tabata, Kyoto (JP); Hiroyuki Ota, Kyoto (JP); Tetsuya Sato, Kyoto (JP)

(73) Assignee: Omron Corporation, Kyoto-Fu (JP)

( * ) Notice: Subject to any disclaimer, the term of this patent is extended or adjusted under 35 U.S.C. 154(b) by 0 days.

(21) Appl. No.: 10/009,595

(22) PCT Filed: Jun. 9, 2000

(86) PCT No.: PCT/JP00/03781

§ 371 (c)(1),
(2), (4) Date: Dec. 11, 2001

(87) PCT Pub. No.: WO00/76392

PCT Pub. Date: Dec. 21, 2000

(30) Foreign Application Priority Data

Jun. 11, 1999 (JP) .................................. 11-165915

(51) Int. Cl.
*G01J 5/04* (2006.01)
*G01K 1/00* (2006.01)
*A61B 5/01* (2006.01)

(52) U.S. Cl. ........................ 374/121; 374/208
(58) Field of Classification Search ................ 374/120, 374/121, 131, 208; 600/474, 549; 128/664
See application file for complete search history.

(56) References Cited

U.S. PATENT DOCUMENTS

| | | | |
|---|---|---|---|
| 3,949,740 A | | 4/1976 | Twentier |
| 4,790,324 A | | 12/1988 | O'Hara et al. |
| 5,018,872 A | * | 5/1991 | Suszynski et al. .......... 374/133 |
| 5,167,235 A | * | 12/1992 | Seacord et al. ............. 128/664 |
| 5,368,038 A | * | 11/1994 | Fraden ...................... 128/664 |
| D409,926 S | * | 5/1999 | Lin et al. .................... D10/57 |
| D416,817 S | * | 11/1999 | Lin .............................. D10/57 |
| 5,991,652 A | * | 11/1999 | Barthelemy et al. ........ 600/474 |
| D419,462 S | * | 1/2000 | Lin .............................. D10/57 |

(Continued)

FOREIGN PATENT DOCUMENTS

DE 198 15 927 A1 10/1999

(Continued)

*Primary Examiner*—Gail Verbitsky
(74) *Attorney, Agent, or Firm*—Morrison & Foerster LLP

(57) ABSTRACT

An object of the present invention is to provide an ear type clinical thermometer in which the main body can be held according to the position of the eardrum of the person whose temperature is being measured. There is provided an ear type clinical thermometer comprising: a main body to be held by hand at a time when an eardrum temperature is to be measured; and a probe fixed to the main body while protruding from the main body and to be inserted into an external auditory canal of a person whose eardrum temperature is to be measured at the time when the measurement is to be taken. The main body has a side at which the probe protrudes from the main body and a side opposite to this side, and the side opposite to the side at which the probe protrudes from the main body is constructed of a curved surface having a substantially constant curvature along a direction perpendicular to a reference plane containing the center axis of the probe. Further, the main body has an indicator for allowing a user to recognize a plurality of methods of holding the main body which differ according to directions in which the probe is to be inserted into the external auditory canal of the person whose temperature is to be measured.

5 Claims, 13 Drawing Sheets

U.S. PATENT DOCUMENTS

| | | | |
|---|---|---|---|
| 6,336,742 B1 * | 1/2002 | Fukura et al. | 374/121 |
| 6,367,973 B1 * | 4/2002 | Yamaka | 374/158 |
| 6,386,757 B1 * | 5/2002 | Konno | 374/158 |
| D458,161 S * | 6/2002 | Lie | D10/57 |
| 2004/0240516 A1 * | 12/2004 | Harr | 374/121 |
| 2005/0085733 A1 * | 4/2005 | Wong | 600/474 |
| 2005/0094705 A1 * | 5/2005 | Chi | 374/121 |

FOREIGN PATENT DOCUMENTS

| | | |
|---|---|---|
| EP | 0 502 277 A2 | 9/1992 |
| EP | 0 937 972 A1 | 8/1999 |
| EP | 0964231 A2 | 12/1999 |
| JP | 11-032998 | 2/1999 |
| WO | 94/20023 A1 | 9/1994 |
| WO | 99/04230 A1 | 1/1999 |

* cited by examiner

FIG. 1
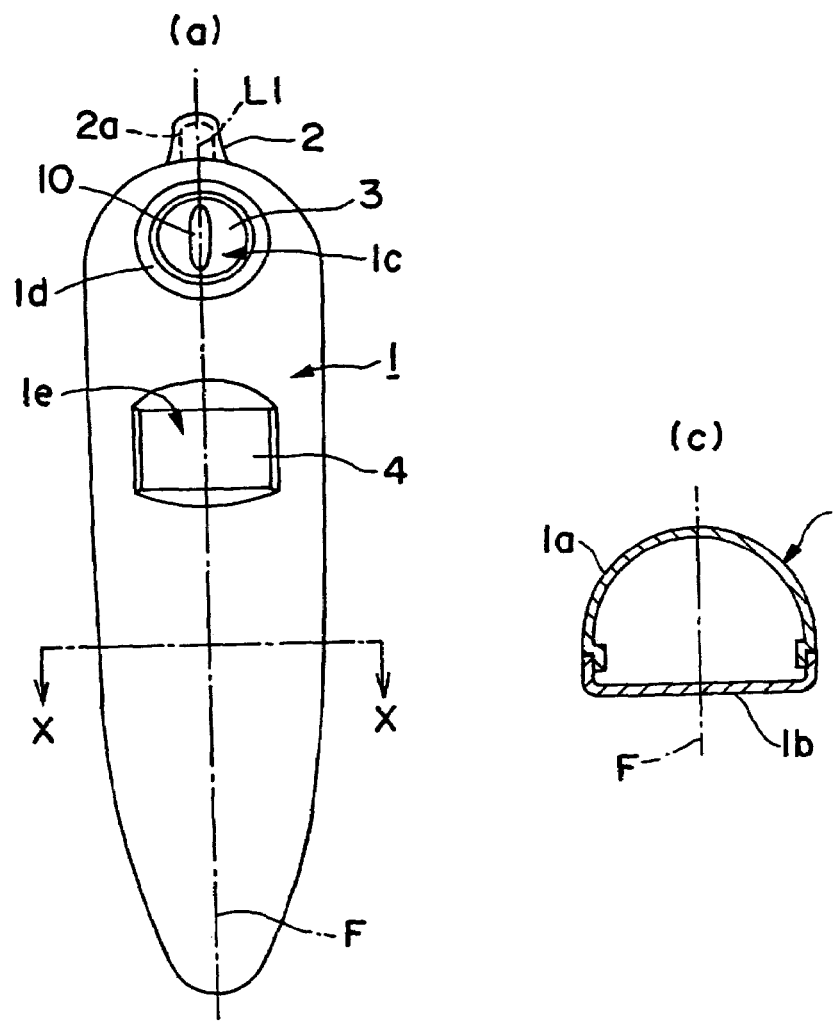
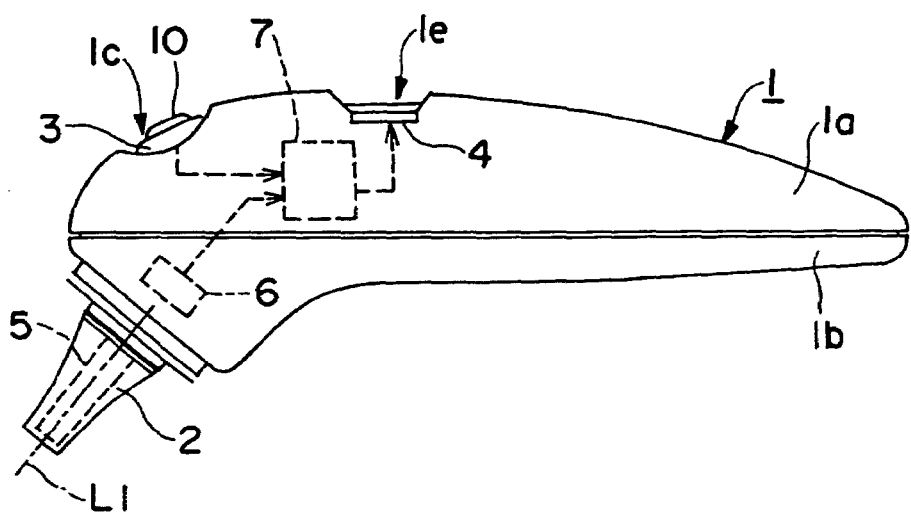

FIG. 5
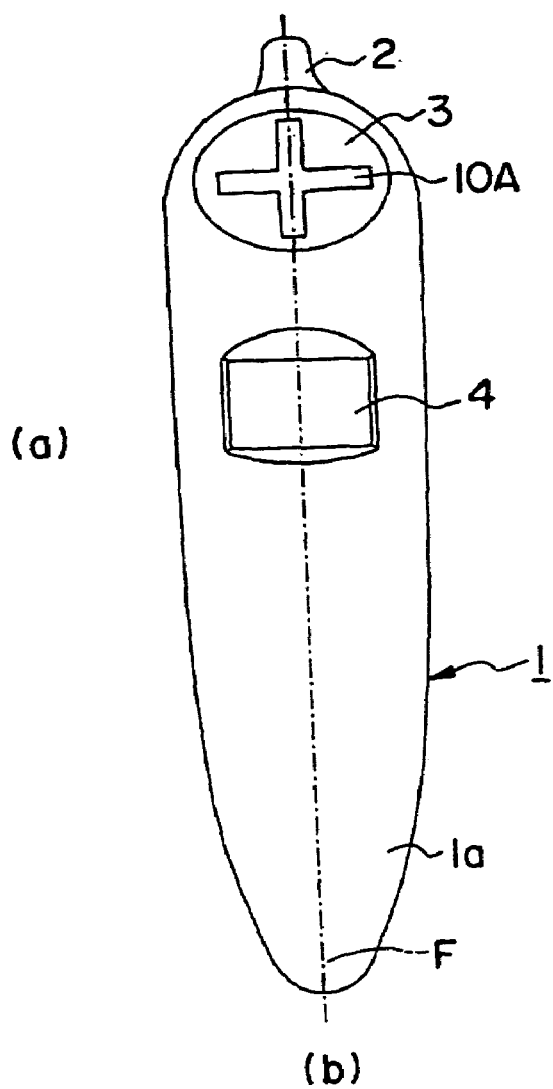
(a)
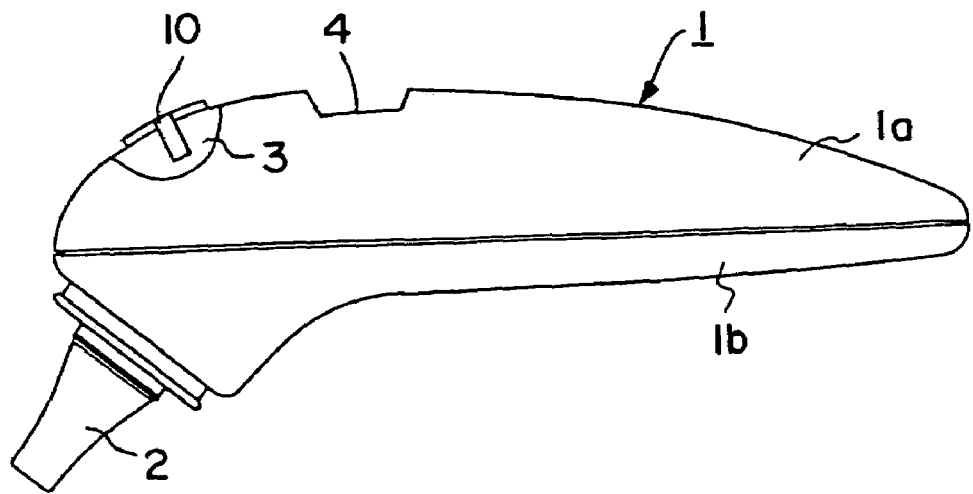
(b)

FIG. 7
(a)
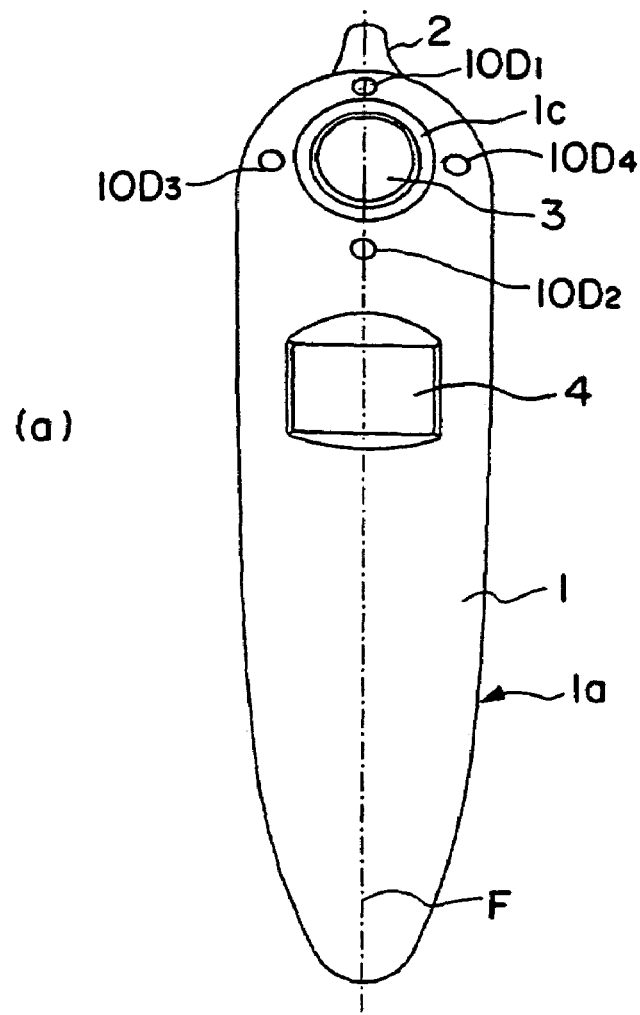
(b)
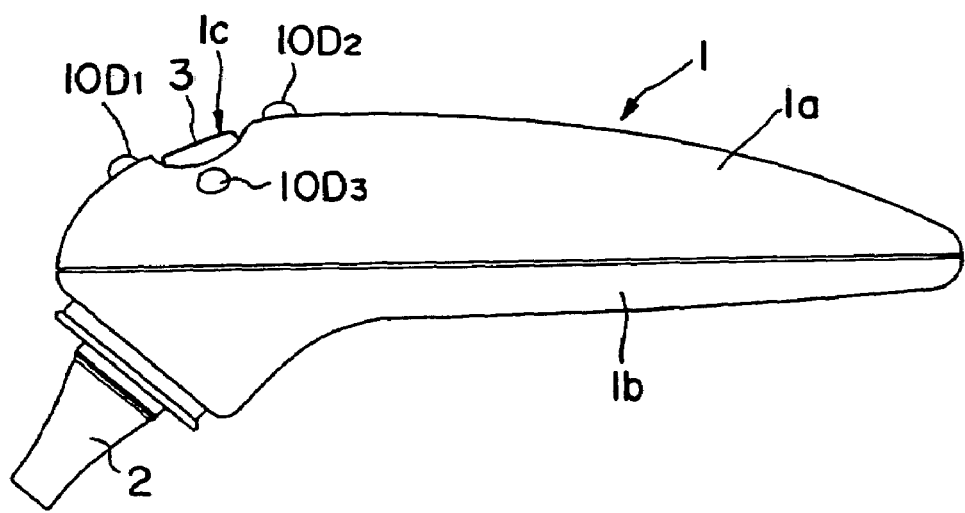

EAR TYPE CLINICAL THERMOMETER

TECHNICAL FIELD

The present invention pertains to an ear type clinical thermometer for measuring a temperature of an eardrum by detecting infrared rays emitted from the eardrum.

DESCRIPTION OF RELATED ART

There was proposed an ear type clinical thermometer for measuring a temperature of an eardrum by measuring infrared rays emitted from an eardrum, measuring the rays by means of an infrared ray sensor in noncontact way. The ear type clinical thermometer substantially has the following construction. Namely, the ear type clinical thermometer has a main body and a probe which projects outward from the main body and is inserted into an ear hole (i.e., external auditory canal) when the eardrum temperature is to be measured. On the interior of the main body there are mounted the infrared ray sensor for detecting infrared rays which have penetrated into the inside of the probe from the eardrum when the probe was inserted into the external auditory canal, and a microcomputer for calculating the eardrum temperature based on the results of the detection performed by the infrared ray sensor. The eardrum temperature calculated by the microcomputer is displayed on a display device provided to the main body.

When a user is to measure the eardrum temperature, he grips the main body and inserts the probe into the external auditory canal of a person whose eardrum temperature is to be measured, and then the user presses a start-measuring switch. When this occurs, the infrared ray sensor detects the infrared rays from the eardrum, and the microcomputer causes the eardrum temperature obtained on the basis of the infrared rays detected to be displayed on the display device. The user references the eardrum temperature displayed on the display device, whereby he learns the body temperature of the person who was measured.

When the eardrum temperature is to be measured, the user grips the main body and inserts the probe into the external auditory canal, thus assuming the posture taken at the time when the measuring is to be performed. In order to make the measuring posture (i.e., the ear type clinical thermometer's appropriate positioning vis-à-vis the body) easier to assume, innovations were made to the conventional ear type clinical thermometer in order to make it easier for the user to grip its main body.

For example, in an ear type clinical thermometer disclosed in U.S. Pat. No. 4,993,424 (hereinafter, referred to as "precedent example 1"), a gun grip is provided to the main body and the user grips the gun grip, whereby the measuring posture becomes easier to assume. Also, an ear type clinical thermometer disclosed in Japanese Patent Application. Laid-open No. Hei 10-118033 (hereinafter, referred to as "precedent example 2"), an arc-shaped portion to be pressed against the body of the person being measured is provided to the main body, producing the result that the ear type clinical thermometer can be held in a steady state.

Incidentally, in order to measure the eardrum temperature of the person appropriately, it is necessary for the infrared ray sensor to detect the infrared rays from the eardrum appropriately. Therefore, the infrared ray sensor is arranged along the probe's center axis in the interior of the main body, and when the probe is inserted into the ear hole it faces the eardrum, and the infrared rays emitted from the eardrum travel through the probe to reach the infrared ray sensor.

Nevertheless, the following problems existed in the conventional ear type clinical thermometer described above. Namely, since the probe could not be moved in a direction to cut off the infrared rays which need to arrive at the infrared ray sensor, it is fixed to the main body so that the position relative to the infrared ray sensor can be maintained constant in an appropriate state.

However, the opening of the external auditory canal and the eardrum are not necessarily aligned along a straight line as seen when viewing the person's head from the side. The eardrum may be positioned more toward the rear side of the head (i.e., more toward the back side of the head) or more toward the face (i.e., more toward the front side of the head) than the opening of the external auditory canal. Furthermore, depending on the person, there are instances in which the external auditory canal is not formed in a straight line, but is curved.

Thus the direction in which the external auditory canal extends toward the eardrum from the opening thereof (i.e., the angle at which the eardrum can be seen from the opening) and the bend of the external auditory canal as it goes from the opening to the eardrum are different for everyone. Therefore, depending on the person being measured, there are cases in which the direction in which the probe is inserted into the external auditory canal has to be modified to fit with the position of the eardrum so that, upon insertion of the probe into the external auditory canal, the infrared ray sensor faces toward the eardrum.

Precedent example 1 has a structure such that the main body is held by gripping the gun grip, so the there is only one appropriate way to grip the main body (i.e., the angle at which the gun grip is to be held). Therefore, when the user has to modify the angle of the probe he must hold the gun grip in an unnatural or unstable state, or bend the wrist and/or arm of the hand gripping the gun grip in an unnatural direction.

Also, precedent example 2 has a structure (which is for making contact with the body of the person) in which the end of the base portion of the probe and the arc-shaped portion are used for point support. Therefore, the only method by which the main body is intended to be held is pressing the arc-shaped portion against the body of the person being measured, and the user is not intended to hold the main body in a state in which the arc-shaped portion is removed from the person's body. Therefore, in the case when the angle of the probe must be modified, it is necessary to hold the main body in a way which is not intended, just as in the case of precedent example 1. Therefore, there were instances where the main body was held in an unnatural, unsteady fashion.

Thus, neither precedent example 1 nor precedent example 2 was intended for adjusting the method of holding the main body in accordance with the angle of the probe, and therefore, when the angle of the probe was changed there were instances when the measuring posture became unnatural and unsteady. When the measuring posture becomes unnatural and unsteady, there is the possibility of making the temperature measurement operation less comfortable. Furthermore, there is the possibility that sufficient amount of infrared rays does not arrive at the infrared ray sensor so that measurement of the eardrum temperature cannot be performed appropriately. Additionally, there is the possibility that such unnatural and unsteady holding method is difficult to learn and difficult to repeat.

SUMMARY OF THE INVENTION

An object of the present invention is to provide an ear type clinical thermometer in which the main body can be held according to the position of the eardrum of the person whose temperature is being measured. In particular, an object thereof is to provide an ear type clinical thermometer in which the main body can be held in more than one way, in order to modify the direction in which the probe is inserted into the external auditory canal depending on the location of the eardrum of the person whose temperature is being measured. Further, an object thereof is to provide an ear type clinical thermometer in which the user can be aware of the plurality of methods which have been prepared for the main body to be held according to the angle at which the probe is inserted into the external auditory canal.

The present invention employs the following construction to solve the above-mentioned problems.

That is, according to a first aspect of the present invention there is provided an ear type clinical thermometer comprising: a main body to be held by hand at a time when an eardrum temperature is to be measured; and a probe fixed to the main body while protruding from the main body and to be inserted into an external auditory canal of a person whose eardrum temperature is to be measured at the time when the measurement is to be taken, characterized in that the main body has a side at which the probe protrudes from the main body and a side opposite to this side, and the side opposite to the side at which the probe protrudes from the main body is constructed of a curved surface having a substantially constant curvature along a direction perpendicular to a reference plane containing the center axis of the probe.

According to the first aspect, the curvature of the curved surface is substantially constant, so when the main body is held from the side opposite to the side at which the probe protrudes from the main body, the user feels no unnatural feeling caused by holding the main body at a different angle, even if the user changes the angle at which the main body is held. Therefore, plural methods of holding the main body can be prepared for the user.

According to the first aspect, the side opposite to the side at which the probe protrudes from the main body may be constructed, for example, as a curved surface which is shaped substantially as an arc in an end face when the main body is cut at a plane which is perpendicular to the reference plane.

According to a second aspect of the present invention, there is provided an ear type clinical thermometer comprising: a main body to be held by hand at a time when an eardrum temperature is to be measured; and a probe fixed to the main body while protruding from the main body and to be inserted into an external auditory canal of a person whose eardrum temperature is to be measured at the time when the measurement is to be taken, characterized in that the main body has an indicator for allowing a user to recognize a plurality of methods of holding the main body which differ according to directions in which the probe is to be inserted into the external auditory canal of the person whose temperature is to be measured.

According to the second aspect it is necessary to change the direction in which the probe is inserted into the external auditory canal, depending on the position of the eardrum of the person whose temperature is to be measured. In the second aspect the indicator is provided, so the user can discern and recognize the plurality of main-body-holding methods. Also, the user can hold the main body according to one of the plurality of main-body-holding methods so as to change the direction in which the probe is inserted. Accordingly, the probe can be inserted in an appropriate direction according to the position of the eardrum, so a body temperature of the person who is to be measured can be measured appropriately.

In the present specification, an operator of the ear type clinical thermometer is referred to as a "user", and a person whose eardrum (body) temperature is to be measured by means of the ear type clinical thermometer is referred to as a "person whose temperature is to be measured".

The second aspect may also have a construction in which the main body has a switch for starting the measuring of the eardrum temperature which is used commonly across all of the plural methods of holding the main body, and the indicator is provided to the surface of the switch.

Further, the second aspect may also have a construction in which the indicator is arranged on a reference plane which contains the center axis of the probe. Also, a construction may be used in which indicators are arranged on either side of the reference plane.

Further, the second aspect may also have a construction in which the main body has a side at which the probe protrudes from the main body and a side opposite to this side, and the side opposite to the side at which the probe protrudes from the main body is constructed of a curved surface having a substantially constant curvature along a direction perpendicular to the reference plane.

Further, the second aspect may have a construction in which the indicator allows the user to recognize and discern, as the plurality of main-body-holding methods, a holding method 1 used in a case when the direction in which the probe is to be inserted is a direction going from the opening of the external auditory canal to the back side of the person whose temperature is to be measured, and a holding method 2 used in a case when the direction in which the probe is to be inserted is a direction going from the opening of the external auditory canal to the front side of the person whose temperature is to be measured Further, the second aspect may have a construction in which the indicator allows the user to recognize, with respect to the plurality of main-body-holding methods, locations on the main body at which a portion of the hand which is to be the reference for the respective holding methods is to be positioned. The portion of the hand which is to become the reference for holding methods is, for example, a finger or the palm such as the thenar, among which the index finger is particularly preferable.

Further, in the second aspect a construction may be used in which the indicator is adhered, printed, constructed as a convex portion, or constructed as a concave portion, for example.

The indicator according to the second aspect can be provided in plural number according to the methods in which the main body is to be held. In such a case, the indicator may be comprised of a combination of a plurality of indicators which are provided according to the plural methods in which the main body is to be held.

According to a third aspect of the present invention, there is provided an ear type clinical thermometer characterized by comprising: a main body to be held by hand at a time when an eardrum temperature is to be measured; a probe fixed to the main body while protruding from the main body and to be inserted into an external auditory canal of a person whose eardrum temperature is to be measured at the time when the measurement is to be taken; and a plurality of start-measuring switches provided in accordance with plurality of methods of holding the main body which differ according to directions in which the probe is to be inserted into the external auditory canal of the person whose temperature is to be measured.

The third aspect may have a construction in which at least one of the plurality of switches is arranged on a reference plane containing the center axis of the probe, and may have a construction in which the plurality of switches are arranged to either side of the reference plane containing the center axis of the probe. Further, a construction may be used in which the main body has a side at which the probe protrudes from the main body and a side opposite to this side; and the side opposite to the side at which the probe protrudes from the main body is constructed of a curved surface having a substantially constant curvature along a direction perpendicular to a reference plane containing the center axis of the probe.

According to a fourth aspect of the present invention, there is provided an ear type clinical thermometer characterized by comprising: a main body to be held by hand at a time when an eardrum temperature is to be measured; a probe fixed to the main body while protruding from the main body and to be inserted into an external auditory canal of a person whose eardrum temperature is to be measured at the time when the measurement is to be taken; and a start-measuring switch which is used in common across a plurality of methods of holding the main body differing according to directions in which the probe is to be inserted into the external auditory canal of the person whose temperature is to be measured, and having a shape which can allow a user to discern and recognize the plurality of main-body-holding methods.

The fourth aspect may have a construction in which the start-measuring switch is arranged in a substantially symmetrical fashion with respect to the reference plane which contains the center axis of the probe. Also, a construction may be used in which the main body has a side at which the probe protrudes from the main body, and a side opposite to this side; and the side opposite to the side at which the probe protrudes from the main body is constructed of a curved surface having a substantially constant curvature along a direction perpendicular to a reference plane containing the center axis of the probe.

According to a fifth aspect of the present invention, there is provided an ear type clinical thermometer comprising: a main body to be held by hand at a time when an eardrum temperature is to be measured; and a probe fixed to the main body while protruding from the main body and to be inserted into an external auditory canal of a person whose eardrum temperature is to be measured at the time when the measurement is to be taken, characterized in that the main body has an indicator surface for allowing a user to recognize a plurality of methods of holding the main body which differ according to directions in which the probe is to be inserted into the external auditory canal of the person whose temperature is to be measured.

In the fifth aspect a construction may be used in which the indicator surface is comprised of a plurality of surfaces and the plurality of surfaces are arranged substantially symmetrically with respect to a reference plane containing the center axis of the probe. Also, it is possible to use a construction in which the indicator surface is comprised of a plurality of substantially flat surfaces and these substantially flat surfaces are aligned along a direction that is perpendicular to the reference plane being joined in such a way that neighboring substantially flat surfaces form an interior angle of 10° to 170°.

BRIEF DESCRIPTION OF THE DRAWINGS

FIG. 1 is a view showing a construction of an ear type clinical thermometer according to Embodiment 1 of the present invention;

FIG. 5 is a view showing a construction of an ear type clinical thermometer according to Embodiment 2 of the present invention;

FIG. 7 is a view showing a construction of an ear type clinical thermometer according to Embodiment 5 of the present invention;

DETAILED DESCRIPTION OF THE INVENTION

Figure 2:
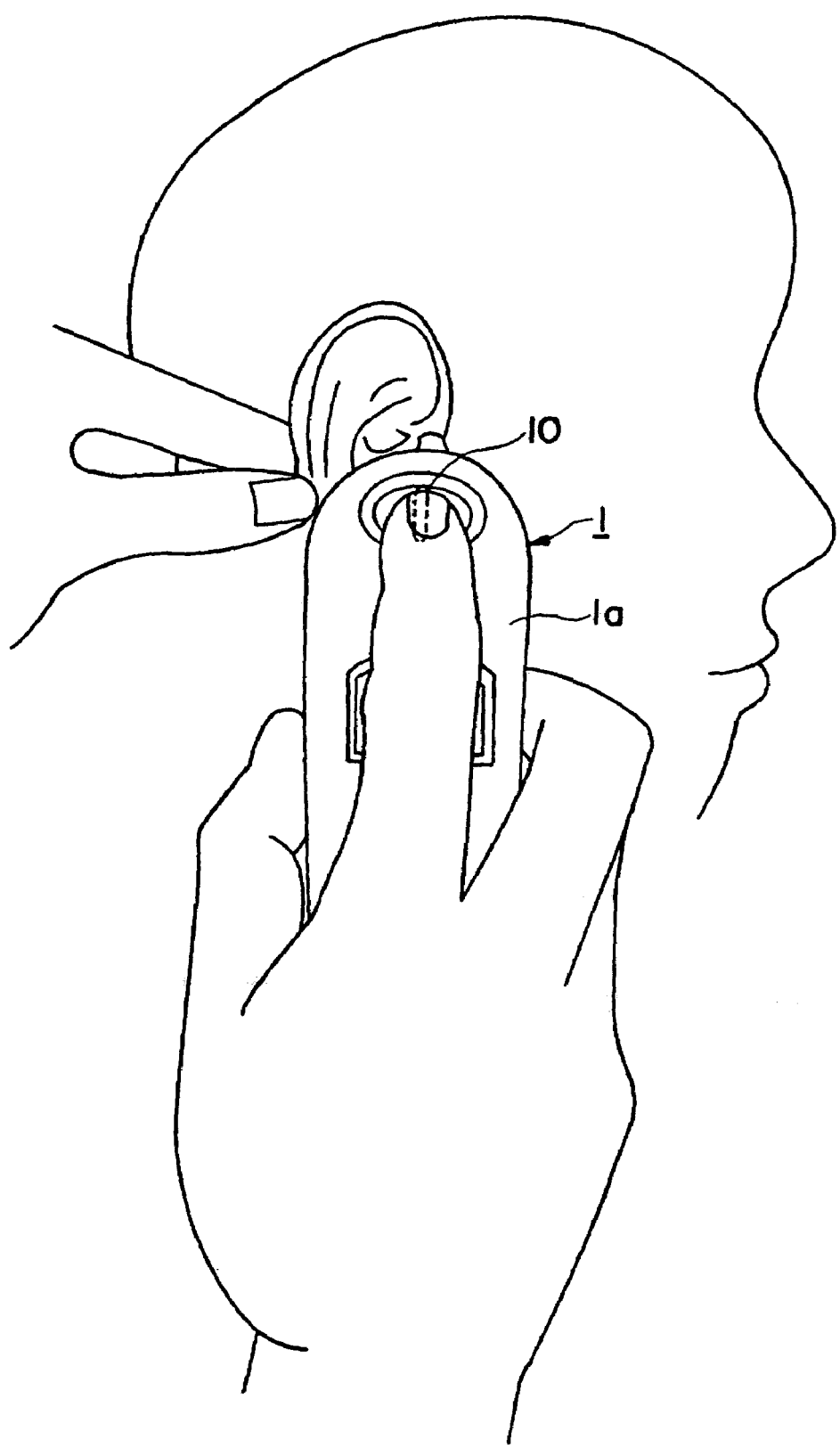
FIG. 2 is an explanatory view showing a method of using the ear type clinical thermometer shown in FIG. 1.

Hereinafter, detailed explanation of embodiments of the present invention will be made making reference to the drawings.

EMBODIMENT 1

(Construction of an Ear Type Clinical Thermometer)

FIG. 1 (*a*) is a frontal view of an ear type clinical thermometer according to Embodiment 1 of the present invention; FIG. 1 (*b*) is a view of a left side of the ear type clinical thermometer shown in FIG. 1 (*a*); and FIG. 1 (*c*) is an end view of a main body 1 taken along a line X—X shown in FIG. 1 (*a*). As shown in FIG. 1 (*a*) and FIG. 1 (*b*), the ear type clinical thermometer is for measuring a persons' body temperature by measuring an eardrum temperature of that person. The thermometer is provided with a main body 1, a probe 2, a switch 3 to start the measuring which functions as a start-measuring switch, and a display device 4.

The main body 1 is constructed such that it has a longitudinal direction (which is a direction of a reference plane F), and a shorter direction (which a direction perpendicular to the reference plane F); it also has a front side (which corresponds to a side opposite to a side at which the probe protrudes), and a back side (which corresponds to the side at which the probe protrudes); and a front side member 1*a* and a back side member 1*b* are joined to each other to thereby form the main body 1. The main body 1 is substantially symmetrical with respect to the reference plane F containing the center axis of the probe 2.

The front side member 1*a* is constructed such that one end thereof along the longitudinal direction is formed like a dome with a larger curvature than the other end, and the surface shape of the front side member 1*a* is formed as a curved surface such that when it is cut along the shorter direction (i.e., in a direction perpendicular to the reference plane F) of the main body 1, no matter at what point this cut were made along the longitudinal direction, the edge surface would be a curved surface having a shape being substantially that of an arc (corresponding to a curved surface which has a substantially constant curvature along the direction perpendicular to the reference plane).

In FIG. 1 (*c*) an example is shown of the curved surface when a cross-section is taken along a plane containing the line X—X along the shorter direction of the front side member 1*a* (i.e., along the direction perpendicular to the reference plane F). The shape of the edge surface is substantially arc-shaped.

Further, the one end side of the front side member 1*a* is provided with a circular first opening 1*c*. The first opening 1*c* has a ring-shaped outer periphery 1*d* which is formed so as to drop down toward the inside of the front side member 1*a*. A second opening 1*e* is also provided to an intermediate portion of the front side member 1*a*.

The probe 2 is formed in a shape of a circular truncated cone, with both ends being open and with the diameter of a base end being larger than the diameter of a tip end. The probe's base end is fixed to the main body 1, and the probe protrudes obliquely outward from one end of the back side member 1*b*. Accordingly, when the ear type clinical thermometer is viewed from its front side the base end protrudes outward beyond one end of the main body along the longitudinal direction. Note that the probe 2 may be formed in an integrated fashion with the main body 1, or may be constructed in a removable fashion.

The switch 3 has a round and flat shape, and is exposed to the exterior from the first opening 1*c*. A surface of the switch 3 has an indicator 10 embossed thereon. The indicator 10 is arranged on the reference plane F and the user views or touches the indicator 10 to confirm and distinguish the left side and the right side of the main body 1. That is, the indicator 10 is provided for the purpose of enabling the user to be aware of and execute plural methods of holding the main body 1.

The display device 4 is set into a second opening 1*e* (not shown) of the front side member 1*a*, and has a rectangular display screen which is constructed of an LCD (Liquid Crystal Display) and exposed to the exterior.

The inside portion of the probe 2 is provided with a tube-shaped waveguide 5 having an axis which is the same as the center axis L1 of the probe 2. Also, a thermopile 6 and a microcomputer 7 are provided in the interior of the main body 1.

The thermopile 6 has an infrared ray sensor and a temperature sensor (i.e., thermistor). The infrared ray sensor is arranged along a line extending from the center axis L1 of the probe 2. Accordingly, infrared rays which radiate into the inside of the probe 2 arrive at the infrared ray sensor via the waveguide 5. The microcomputer 7 is electronically connected to the switch 3, the display device 4, and the thermopile 6.

(Method for Using the Ear Type Clinical Thermometer)

Figure 3:
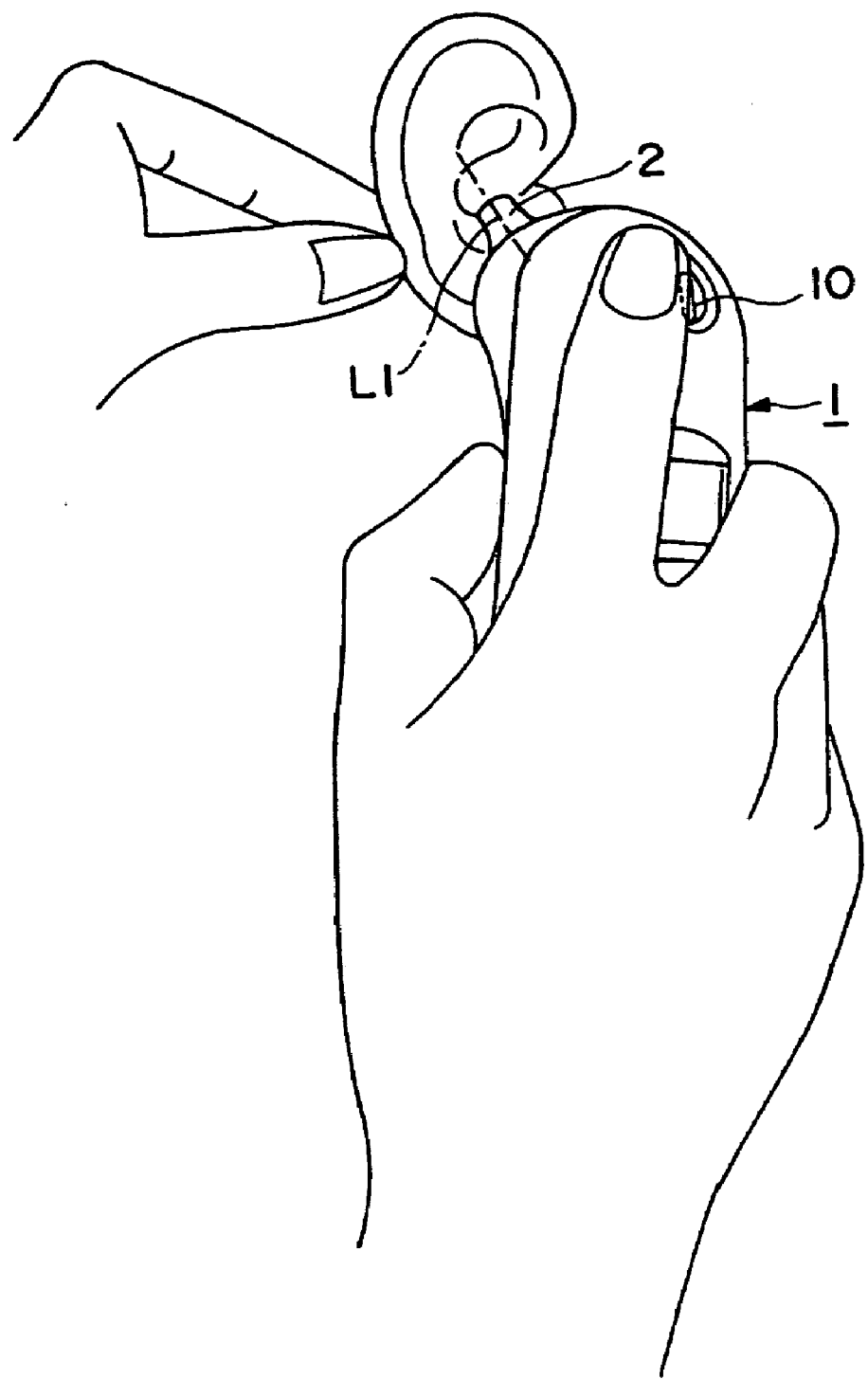
FIG. 3 is an explanatory view showing a method of using the ear type clinical thermometer shown in FIG. 1.
Figure 4:
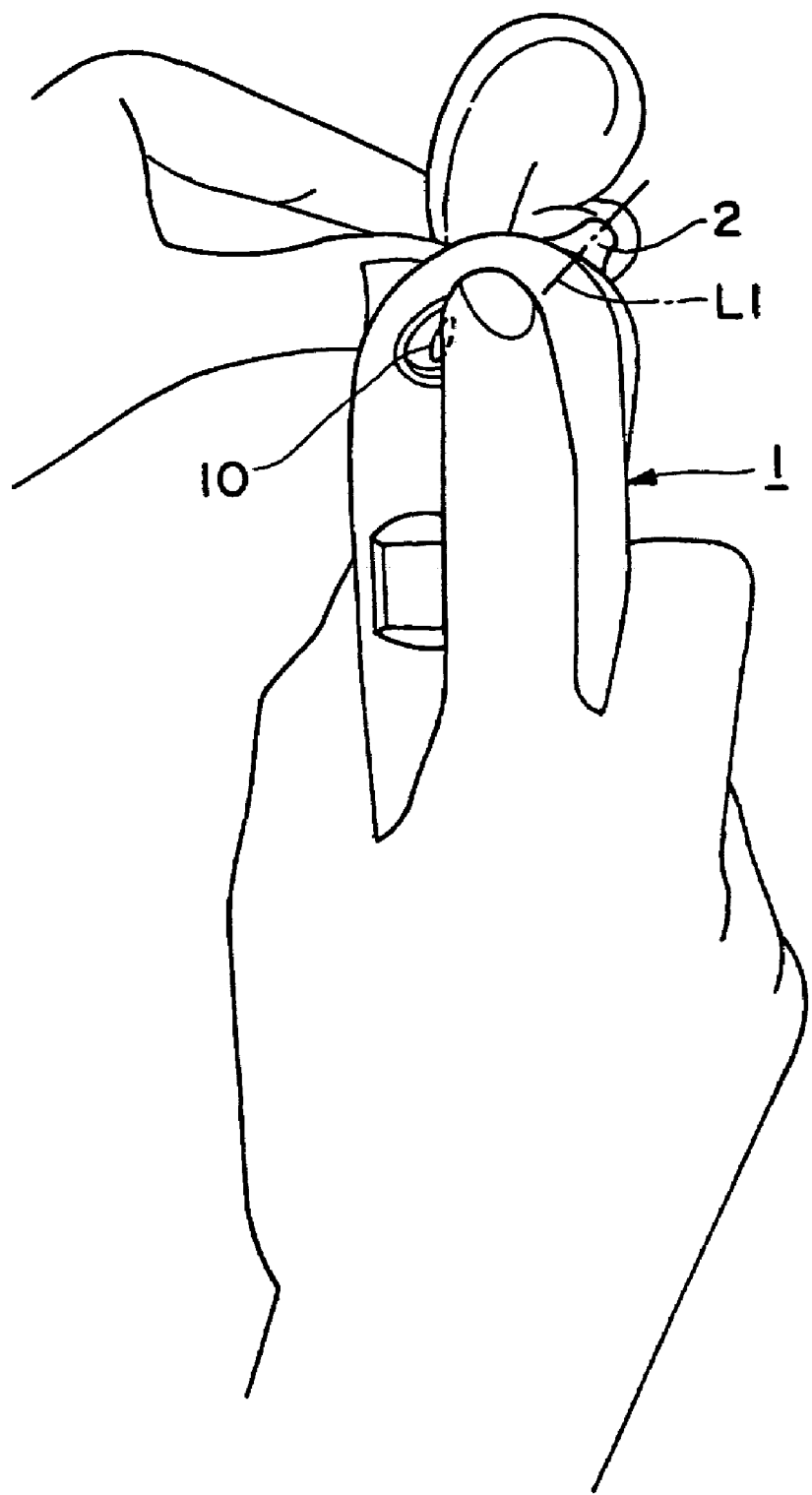
FIG. 4 is an explanatory view showing a method of using the ear type clinical thermometer shown in FIG. 1.

Next, explanation will be made of a method of using the ear type clinical thermometer shown in FIG. 1, along with an example of operations of the ear type clinical thermometer, making reference to FIG. 1 to FIG. 4. FIG. 2 to FIG. 4 are explanatory views showing how to use (how to hold) the ear type clinical thermometer shown in FIG. 1.

Note that FIG. 2 to FIG. 4 depict a case in which the user of the ear type clinical thermometer is measuring the temperature of another person; however, the method of use is the same in when the user and the person whose temperature is being measured are the same person.

First, the user turns on an electrical power source switch (not shown) provided to the main body 1. When this occurs, the microcomputer boots up and predetermined initial configurations (ex, battery check, processing for preparing to take the measurement, etc.) are performed. Then, after the initial configurations are completed, the user presses the switch 3 to put the thermometer into a state for beginning the measuring of the eardrum (body) temperature (i.e., a state in which the thermometer is waiting to begin the measuring).

After that, the user grips the thermometer, with one end of the main body 1 (i.e., the side on which the switch 3 is provided) being faced upward, and by using placement position of the index finger of the hand gripping the main body 1 as a reference point. In other words, the user directs the tip of the index finger toward the one end of the main body 1 along the longitudinal direction and determines the position at which the index finger is to be placed with respect to the main body 1. The user then holds the main body 1 by gripping it from the front side in a natural fashion according to the position of the index finger.

In the case when the person whose temperature is being measured has never had his temperature measured by this ear type clinical thermometer before, or when the opening of the external auditory canal and the eardrum are located on the same straight line as viewed from the side of the person's head, then the user applies the tip of his index finger to the indicator 10 (i.e., switch 3) as shown in FIG. 2, and then grips the main body 1 from the front side in such a way that the index finger is positioned along a line extending from the indicator 10 (i.e., on the reference plane F). This holding method is called "holding method 1".

On the other hand, for example, if the user knows that the eardrum of the person to be measured is positioned more toward the rear portion of his head (i.e., more toward the back side) than the opening of his external auditory canal as viewed from the side of the person's head, as shown in FIG. 3, then the user applies the tip of the index finger to the left side of the indicator 10 of the switch 3, and then maintains the index finger at its position on the left side of the line extending from the indicator 10 (i.e., the left side of the reference plane F) as he grips the main body 1 from the front side. This holding method is called "holding method 2" (corresponding to holding method 1 of the present invention).

However, for example, if the user knows that the eardrum of the person to be measured is positioned more towards the face (i.e., more toward the front side) than the opening of his external auditory canal as viewed from the side of the person's head, then the user applies the tip of the index finger to the right side of the indicator 10 of the switch 3 as shown in FIG. 4, and then maintains the index finger at its position on the right side of the line extending from the indicator 10 (i.e., the right side of the reference plane F) as he grips the main body 1 from the front side. This holding method is called "holding method 3". (corresponding to holding method 2 of the present invention.)

After that, the user holds the main body 1 according to one of holding methods 1 to 3 and inserts the tip of the probe 2 into the external auditory canal. At this time, if the user is holding the main body 1 according to holding method 1, the center axis L1 of the probe 2 is substantially perpendicular to the plane of the inside face of the index finger, as shown in FIG. 2.

Therefore, if the user leads the tip of the probe 2 into the opening of the external auditory canal with the wrist being fixed in this position, then the probe 2 can be inserted into the external auditory canal at an angle substantially perpendicular to the lip of the opening of the external auditory canal (i.e., an angle of the probe 2 is substantially parallel to the opening of the external auditory canal).

On the other hand, if the user grips the main body 1 according to holding method 2, then the center axis L1 of the probe 2 is turned toward the left side of the inside face of the index finger, as shown in FIG. 3.

Therefore, if the user leads the tip of the probe 2 into the opening of the external auditory canal with the wrist fixed in this position, then the probe cane be inserted into the external auditory canal while being turned at an angle toward the rear portion of the person's head with respect to the lip of the opening of the external auditory canal (i.e., the probe is inserted in a direction going from the opening of the external auditory canal to the back side of the person to be measured).

In the case when the user holds the main body 1 according to holding method 3, then the center axis L1 of the probe 2 is turned toward the right side of the inside face of the index finger, as shown in FIG. 4.

Therefore, if the user leads the tip of the probe 2 into the opening of the external auditory canal with the wrist being fixed in this position, then the probe can be inserted into the external auditory canal while being turned at an angle toward the person's face with respect to the lip of the opening of the external auditory canal (i.e., the probe is inserted in a direction going from the opening of the external auditory canal to the front side of the person to be measured).

Thus the probe 2 is inserted into the external auditory canal in such a way so that the infrared ray sensor faces the eardrum. Accordingly, the infrared rays emitted from the eardrum can pass through the waveguide 5 of the probe 2 to arrive at the infrared ray sensor of the thermopile 6.

After this takes place, if the user presses the switch 3 with the index finger that is gripping the main body 1, then a signal to start measuring the temperature of the eardrum is inputted to the microcomputer 7 from the switch 3, and the measuring process starts after the microcomputer 7 makes a start-measuring buzzer (not shown) ring.

When the infrared ray sensor receives the infrared rays from the eardrum, the temperature of the infrared ray sensor rises. When the measuring processing starts, the microcomputer 7 inputs a signal for starting the measurement to the thermopile 6. When this start-measuring signal is inputted to the thermopile 6, the infrared ray sensor inputs a signal to the microcomputer 7 during a predetermined measuring duration, which signal being proportional to a temperature increase value in accordance with the amount of infrared rays received with the infrared ray sensor. Also, the temperature sensor of the thermopile 6 inputs to the microcomputer 7 a signal corresponding to the temperature of the infrared ray sensor's own.

When this occurs, the microcomputer 7 calculates the temperature of the eardrum of the person to be measured, based on the signal inputted from the infrared ray sensor and the temperature sensor, and after the microcomputer 7 makes a measuring-completion buzzer ring, it then displays the result of the calculation onto the display device 4 and ends the measuring process. After that, the user or the person whose temperature was measured can learn the body temperature of the person measured by referencing the eardrum (body) temperature which is displayed on the display device 4. Then, if this is the first time for the person having been temperature-measured to have his body temperature measured by this ear type clinical thermometer, then the user changes the method of holding the main body 1 to holding method 2 and holding method 3 and measures the body temperature using each of these holding methods.

After that, the user or the person being measured compares the results of the body temperature measurement performed according to holding methods 1 to 3, and the holding method with which the highest temperature is indicated is memorized as the appropriate holding method (i.e., the appropriate measuring posture).

The reason for this is that, with respect to holding methods with which the highest temperature was not indicated, it can be assumed that the direction in which the probe 2 was inserted into the external auditory canal was not appropriate. Accordingly, the infrared rays from the eardrum were cut off by the wall of the eardrum or by the probe 2 or the like, and infrared rays which should have arrived at the infrared ray sensor did not arrive at it.

Therefore, when the person's body temperature is to measured again in the future, if the user or the person measured holds the main body 1 according to the holding method which he remembers and operates the ear type clinical thermometer according to one of the methods described above, then it will be possible to take the measurement of the body temperature in an appropriate measuring posture, and it will be possible to obtain a correct value for the body temperature.

As explained above, in the ear type clinical thermometer according to Embodiment 1 of the present invention, a plurality of holding methods are prepared which are to be executed according to directions in which the probe is inserted into the external auditory canal, and the switch 3 is provided with an indicator 10 to allow the user to recognize these plurality of holding methods. Accordingly, if the user recognizes the indicator 10 through his vision or touch, then the user can learn that there are three methods of holding the main body 1, namely holding methods 1 to 3 described above. Also, when the main body 1 is to be held, if the indicator 10 is used as a reference to grip the main body 1 according thereto, then the above-mentioned holding methods 1 to 3 can be executed easily.

That is, holding methods 1 to 3 are similar to each other in that the main body 1 is held from the front side, and they are different from each other in that the angles in which the main body 1 is held are slightly different from each other. The shape of the surface of the front side member 1a along its shorter direction is a curved surface similar to the surface of a round column, so there is substantially no change in the user's tactile sensation when the user changes from holding method 1 to holding method 2 or holding method 3. Further, the only aspect that is different among holding methods 1 to 3 is the angle at which the main body 1 is gripped from the front side, so the way it is held itself does not change. Therefore, the angles of the wrists, elbow and shoulder when the measuring posture is assumed is substantially identical across holding methods 1 to 3.

Thus, since there is substantially no variation in terms of the tactile sensation of the main body 1 and the measuring posture across holding methods 1 to 3, the user can experience substantially the same impression for use when using any of holding methods 1 to 3. Therefore, now matter which of holding methods 1 to 3 the user uses to hold the main body 1 according to the position of the eardrum of the person whose temperature is to be measured, it is still possible to assume a natural and stable measuring posture.

Further, the indicator 10 is provided to the main body 1, so it is possible to recognize and execute holding methods 1 to 3 according to the indicator 10. Therefore, in the case when it is necessary to change the angle at which the probe 2 is inserted into the external auditory canal due to the position of the person's eardrum, holding method can be changed with reference to the indicator 10. The alteration of the method of holding the main body 1 in order to change the direction in which the probe 2 is inserted into the external auditory canal can thus be performed easily. Therefore, the temperature of the person to be measured may be measured appropriately Thus, when the person who is to be measured is using the ear type clinical thermometer for the first time, if the person's body temperature is measured according to each of holding methods 1 to 3 then it is possible to ascertain the most appropriate direction in which to insert the probe 2 into the external auditory canal for that person (i.e., the angle at which the eardrum can be seen). Then, if holding method which offers the most appropriate insertion angle for that person is remembered using the indicator 10 as a reference, then holding method of the main body 1 can be easily reproduced in the future using the indicator 10 as the reference. Therefore, it becomes possible to repeat the most appropriate direction of inserting the probe for that person in a reliable fashion.

Note that, according to Embodiment 1, the first opening 1c is provided with the ring-shaped outer periphery 1d. This outer periphery 1d is substantially symmetrical along the reference plane F, and it serves as a reference for the user to determine the placement position of the index finger by tracing this outer periphery 1d with the tip of the finger. Therefore, the outer periphery 1d also has an indicator function.

EMBODIMENT 2

FIG. 5(*a*) is a frontal view of the ear type clinical thermometer according to Embodiment 2 of the present invention, and FIG. 5(*b*) is a left side view of the ear type clinical thermometer of FIG. 5(*a*). Embodiment 2 has substantially the same construction as that of Embodiment 1, except that the shape of the indicator is different from that in Embodiment 1. Therefore, explanation of the aspects common to the two embodiments will be omitted, and explanation will be made of the points of difference only.

As shown in FIG. 5(*a*) and FIG. 5(*b*), the indicator 10A in Embodiment 2 is an embossed cross shape arranged along the longitudinal direction and shorter direction of the main body 1. The region of the indicator 10A arranged along the longitudinal direction of the main body 1 is positioned on the reference plane F.

A method by which the ear type clinical thermometer of Embodiment 2 is used is substantially similar to that of Embodiment 1. At the time when the ear type clinical thermometer is to be used, when the user is to hold the main body 1 the user makes the tip of his index finger contact with the region of the indicator which corresponds to the longitudinal direction of the main body 1 and uses this as a reference to grip the main body 1. Accordingly, it becomes possible to execute holding method 1 described above. Also, when the user makes the tip of his index finger contact with the region of the indicator which is on the left side of the reference plane F along the main body's shorter direction and then grips the main body using this as a reference, then it becomes possible to execute holding method 2 described above. Additionally, when the user makes the tip of his index finger contact with the region of the indicator which is on the right side of the reference plane F along the main body's shorter direction and then grips the main body using this as a reference, then it becomes possible to execute holding method 3 described above.

Furthermore, when the user is to execute holding method 2 or holding method 3, if he visually or tactilely recognizes the left-side edge portion and the right-side edge portion of the region of the indicator 10A which is provided along the shorter direction of the main body 1, then it is possible for the user to have some idea of the position of his index finger at the time when holding method 2 or holding method 3 is to be executed; therefore, it becomes easy to execute holding methods 2 and 3, and it becomes possible to take an appropriate body temperature measurement.

EMBODIMENT 3

Figure 6:
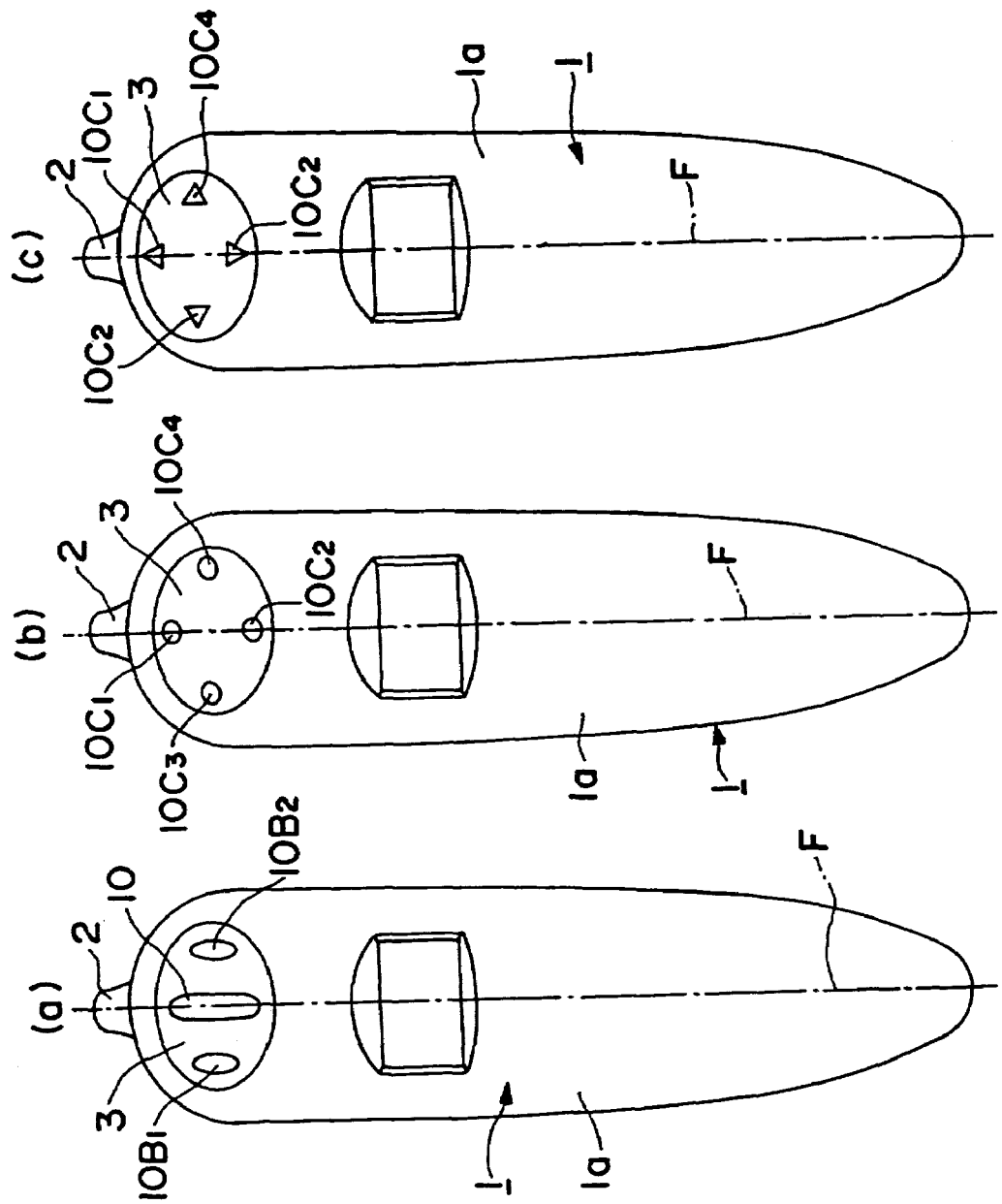
FIG. 6 is a view showing a construction of an ear type clinical thermometer according to Embodiment 3 and Embodiment 4 of the present invention.

FIG. 6(*a*) is a frontal view of the ear type clinical thermometer according to Embodiment 3 of the present invention. As shown in FIG. 6(*a*), in the ear type clinical thermometer according to Embodiment 3, on the two sides of the indicator 10 shown in FIG. 1 there are formed oval-shaped indicators 10$B_1$ and 10$B_2$ embossed parallel to the indicator 10 and at equal distances from the indicator 10. Except for this, the construction of Embodiment 3 is substantially similar to that of Embodiment 1.

A method by which the ear type clinical thermometer of Embodiment 3 is used is substantially similar to that of Embodiment 1. However, when the user is to hold the main body 1, the user makes the tip of his index finger contact with the indicator 10$B_1$ and uses this as a reference to grip the main body 1, then it becomes possible to execute holding method 2. On the other hand, when the user makes the tip of his index finger contact with the indicator 10$B_2$ and uses this as a reference to grip the main body 1, it becomes possible to execute holding method 3.

EMBODIMENT 4

FIG. 6(*b*) is a frontal view of the ear type clinical thermometer according to Embodiment 4 of the present invention. As shown in FIG. 6(*b*), in the ear type clinical thermometer according to Embodiment 4, there are four round-shaped indicators 10$C_1$ to 10$C_4$ embossed (i.e., in convex) on the surface of the switch 3.

The indicators 10$C_1$ and 10$C_2$ are each formed on the reference plane F along the longitudinal direction of the main body, and the indicators 10$C_3$ and 10$C_4$ are each formed substantially symmetrical to each other with respect to the reference plane F. Except for this, the construction of Embodiment 4 is substantially similar to that of Embodiment 1.

A method by which the ear type clinical thermometer of Embodiment 4 is used is substantially similar to that of Embodiment 1. However, when the user is to hold the main body 1, the user makes the tip of his index finger contact with at least one of the indicators $10C_1$ and $10C_2$ and uses this as a reference to grip the main body 1, then it becomes possible to execute holding method 1. Also, when the user makes the tip of his index finger contact with the indicator $10C_3$ and uses this as a reference to grip the main body 1, it becomes possible to execute holding method 2. Additionally, when the user makes the tip of his index finger contact with the indicator $10C_4$ and uses this as a reference to grip the main body 1, it becomes possible to execute holding method 3 described above.

Note that in Embodiment 4 the indicators $10C_1$ to $10C_4$ are round in shape; however, as indicated in FIG. 6(c), it is also possible to form them as triangle shapes with their tips arranged so as to face out in the directions to which the shorter direction and the longitudinal direction of the main body 1 extend.

EMBODIMENT 5

FIG. 7(a) is a frontal view of the ear type clinical thermometer according to Embodiment 5 of the present invention, and FIG. 7(b) is a left side view of the ear type clinical thermometer of FIG. 7(a). Embodiment 5 is different from Embodiments 1 to 4 in that a plurality of indicators for allowing the user to recognize and execute the plurality of main-body-holding methods are not provided to the surface of the switch 3, but are provided to the surface of the front side member 1a of the main body 1.

As shown in FIG. 7(a) and FIG. 7(b), on the front side member 1a there are formed a plurality of semi-spherical (i.e., appearing round in a plane view) indicators $10D_1$ to $10D_4$. The respective indicators $10C_1$ and $10C_2$ are formed in the vicinity of the first opening 1c and are arranged on the reference plane F, and the indicators $10D_3$ and $10D_4$ are arranged substantially symmetrically to each other with respect to the reference plane F. Except for this, the construction of Embodiment 5 is substantially similar to that of Embodiment 1.

A method by which the ear type clinical thermometer of Embodiment 5 is used is substantially similar to that of Embodiment 4. That is, when the ear type clinical thermometer is to be held, if the user makes the tip of his index finger contact with at least one of the indicators $10D_1$ and $10D_2$ and uses this as a reference to grip the main body 1, then holding method 1 can be executed. If the user makes the tip of his index finger contact with the indicator $10D_3$ and then grips the main body 1, then it becomes possible to execute holding method 2. Additionally, when the user makes the tip of his index finger contact with the indicator $10D_4$ and then grips the main body 1, then it becomes possible to execute holding method 3 described above.

Note that in Embodiment 5 the indicators $10D_1$ to $10D_4$ are semi-spherical in shape; however, the indicators $10D_1$ to $10D_4$ may also be formed embossed such that they are triangles in plane view as in Embodiment 4.

EMBODIMENT 6

Figure 8:
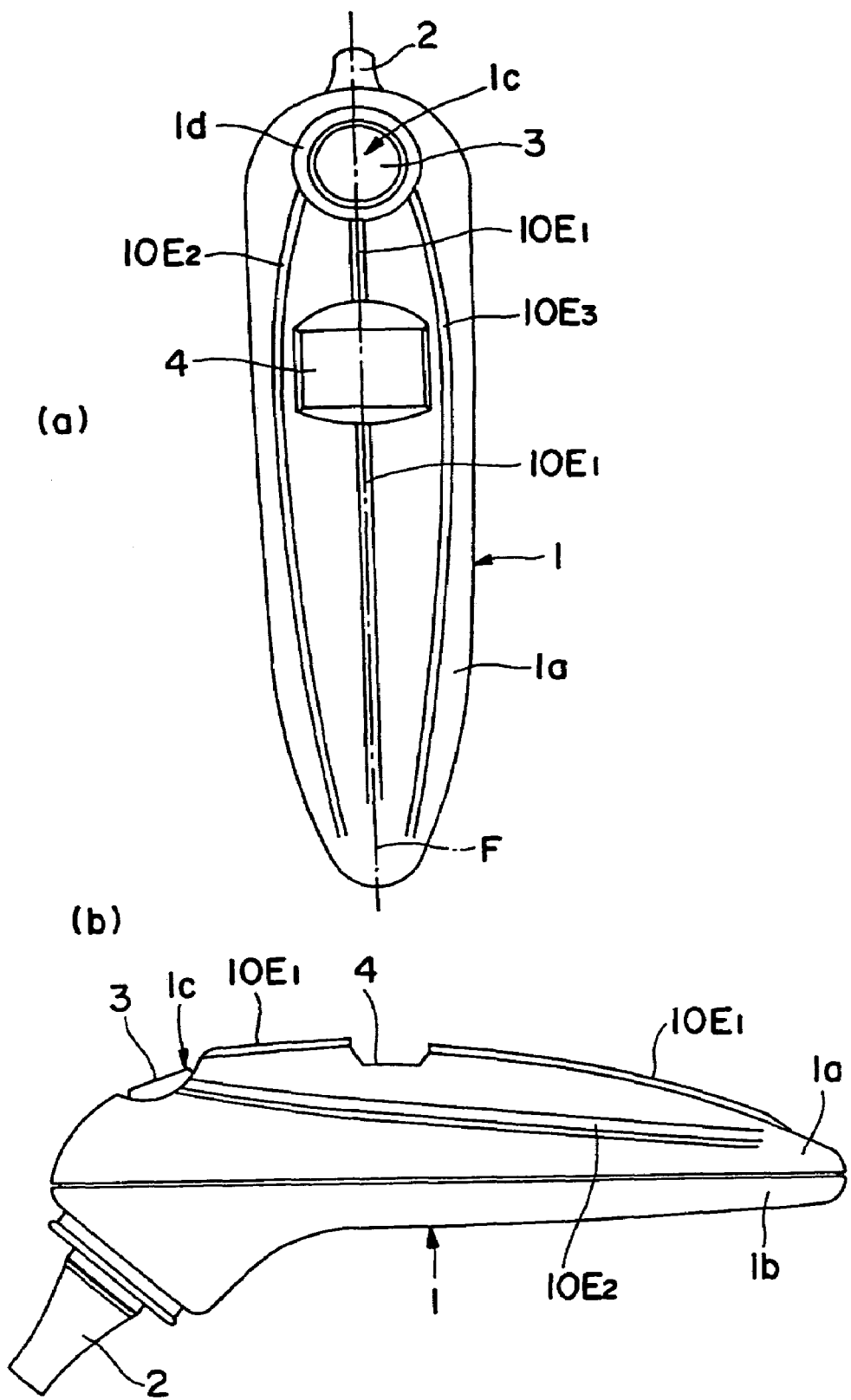
FIG. 8 is a view showing a construction of an ear type clinical thermometer according to Embodiment 6 of the present invention.
Figure 9:
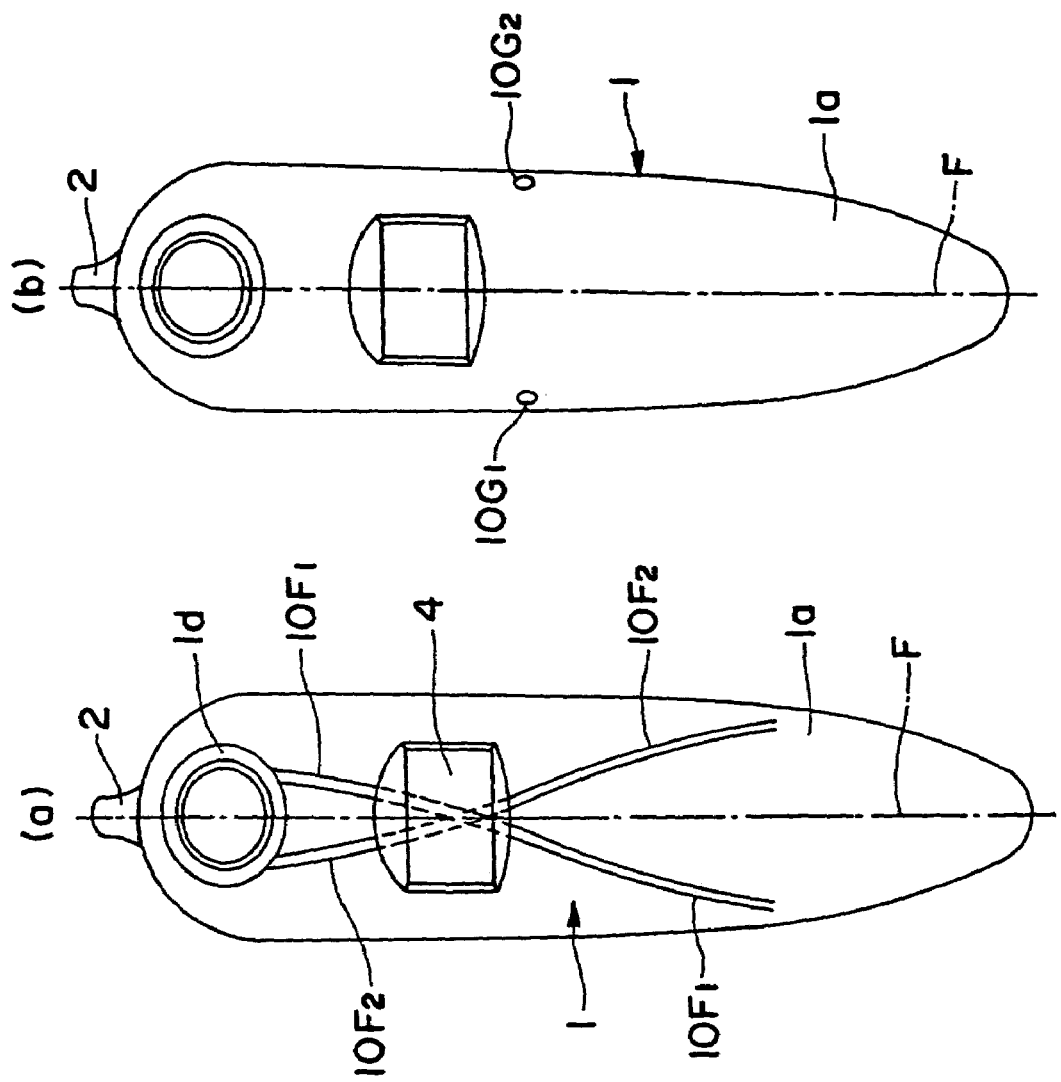
FIG. 9 is a view showing an example variation of the ear type clinical thermometer shown in FIG. 8.

FIG. 8(a) is a frontal view of the ear type clinical thermometer according to Embodiment 6 of the present invention, FIG. 8(b) is a left side view of the ear type clinical thermometer of FIG. 8(a), and FIG. 9(a) and FIG. 9(b) are views depicting example variations of the ear type clinical thermometer shown in FIG. 8. As shown in FIG. 8, in Embodiment 6 there are a plurality of indicators $10E_1$ to $10E_3$ formed to the surface of the front side member 1a of the main body 1. The indicators $10E_1$ to $10E_3$ are formed to the surface of the front side member 1a of the main body 1. Each of the indicators $10E_1$ to $10E_3$ is formed embossed in a belt shape.

The indicator $10E_1$ is formed on the reference plane F running from the outer periphery 1d of the first opening 1c to the other end of the main body 1. Further, the indicators $10E_2$ and $10E_3$ are formed running from the outer periphery 1d to the other end symmetrically to each other with respect to the reference plane F so as to run along the index finger when the main body 1 is being held according to holding method 2 and holding method 3. Except for this, the construction of Embodiment 6 is substantially similar to that of Embodiment 1.

A method by which the ear type clinical thermometer of Embodiment 6 is used is substantially similar to that of Embodiment 1. However, when the user is to hold the main body 1, the user positions the tip of his index finger along the indicator $10E_1$, then it becomes possible to execute holding method 1. Also, when the user positions the tip of his index finger along the indicator $10E_2$, it becomes possible to execute holding method 2. Additionally, when the user positions the tip of his index finger along the indicator $10E_3$, it becomes possible to execute holding method 3.

Note that in Embodiment 6 there are provided the three belt-shaped indicators $10E_1$ to $10E_3$; however, as shown in FIG. 9(a), it is also possible to provided belt-shaped indicators $10F_1$ and $10F_2$ extending from the outer periphery 1d to toward the other end and crossing at the reference plane F (although the broken line portion shown in FIG. 9(a) does not actually exist).

According to this construction, by positioning the index finger between the two indicators $10F_1$ and $10F_s$ to assume the grip, it thus becomes possible to execute holding method 1. Also, by determining the placement position of the index finger according to the part of the indicator $10F_2$ toward the one end of the main body 1 past the display device 4, it thus becomes possible to execute holding method 2. Additionally, by determining the placement position of the index finger according to the part of the indicator $10F_1$ toward the one end of the main body 1 past the display device 4, it thus becomes possible to execute holding method 3.

Further, instead of the indicators $10E_1$ to $10E_3$, $10F_1$ and $10F_2$ shown in FIG. 8 and FIG. 9(a), it is also possible for the front side member 1a to be constructed with indicators $10G_1$ and $10G_2$ provided at the vicinities of the respective outer edge portions along the shorter direction at approximately the middle area along the longitudinal direction of the front side member 1a, and arranged substantially symmetrically to each other with respect to the reference plane F and being round-shaped in plane view.

According to this construction, by positioning the index finger along the central line of the longitudinal direction (i.e., along the reference plane F) of the front side member 1a, it thus becomes possible to execute holding method 1. Also, by determining the position of the index finger according to the indicator $10G_1$, it thus becomes possible to execute holding method 2. Additionally, by determining the position of placing the index finger according to the indicator $10G_2$ it thus becomes possible to execute holding method 3.

Note that the indicators $10E_1$ to $10E_3$, $10F_1$ and $10F_2$ shown in FIG. 8(a) (b) and FIG. 9(a) may be shaped as dotted lines in their plane view, instead of being belt-shaped. As long as the user can discern and recognize the plurality of holding methods, as regards the shape of the indicators, any shape, pattern, color or combination thereof may be employed therefor. For example, it is also possible to form the indicator by painting the main body and the switch in different ways according to the holding methods.

The above-mentioned Embodiments 1 to 6 are constructed with the indicators that are embossed (in a convex fashion); however, the convex indicators may also be formed integrally with the main body 1, or may be attached after the main body 1 is formed.

It is also possible for the indicators to be formed in a concave fashion to the surface of the main body or the switch, or printed or drafted onto the surface of main body or the switch, or adhered as stickers onto the surface of the main body or the switch.

No matter which of the above methods is used, as long as there is provided a sufficient height difference to enable recognition of the border between the main body and the switch by tracing this border with the finger, then it is possible to recognize the plurality of holding methods visually or tactilely. However, in the case where the surfaces of the indicators are flush with the main body and the switch, then it is only possible to recognize the plurality of holding methods visually.

Further, it is also possible for each of holding methods 1 to 3 to be constructed from a combination of a plurality of sets of indicators. For example, it is possible to adopt a construction having combination of a plurality of indicators which show the respective positions for the index finger, the thumb and the ring finger for each of holding methods 1 to 3.

EMBODIMENT 7

Figure 10:
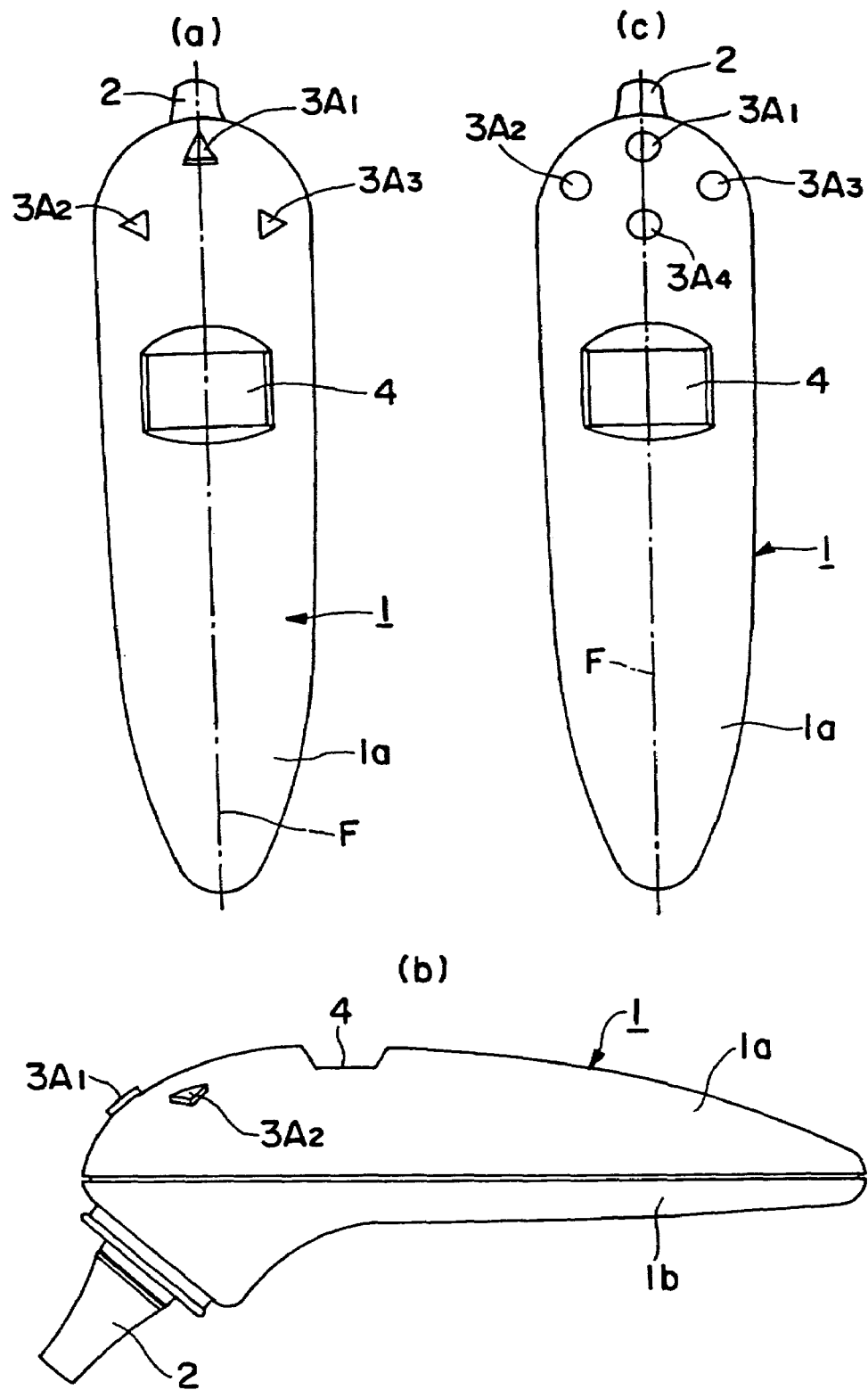
FIG. 10 is a view showing a construction of an ear type clinical thermometer according to Embodiment 7 of the present invention.

FIG. 10($a$) is a frontal view of the ear type clinical thermometer according to Embodiment 7 of the present invention, FIG. 10($b$) is a left side view of the ear type clinical thermometer shown in FIG. 10($a$), and FIG. 10($c$) is a frontal view showing an example variation of the ear type clinical thermometer shown in FIGS. 10($a$) and ($b$).

Embodiment 7 is different from Embodiments 1 to 6 in that instead of the indicators explained in connection with Embodiments 1 to 6, there are a plurality of start-measuring switches provided to the main body 1, for allowing the user to recognize the plural methods of holding the main body 1.

As shown in FIG. 10($a$) and FIG. 10($b$), on one end side along the longitudinal direction of the front side member 1$a$, there are formed a plurality of switches $3A_1$ to $3A_3$, which are triangular in their plane view, in such a state that they protrude from the surface of the front side member 1$a$. Switch $3A_1$ is provided on the reference plane F in a state such that one of the tips thereof faces in the direction of the one end of the front side member 1$a$ along its longitudinal direction. The switches $3A_2$ and $3A_3$ are provided substantially symmetrically to each other with respect to the reference plane F, in such a state that one tip of each switch is facing out in the direction in which the shorter direction of the front side member 1$a$ extends (i.e., in the directions perpendicular to the reference plane F).

In other words, the switches $3A_1$ to $3A_3$ are provided in substantially the same positions as the indicators $10D_1$ to $10D_3$ of Embodiment 5. Except for this, the construction of Embodiment 7 is substantially similar to that of Embodiment 1.

A method for using the ear type clinical thermometer according to Embodiment 7 uses substantially the same method as in the case of Embodiment 5 to execute holding methods 1 to 3. However, what is different from Embodiment 5 is the switches are provided at the positions of the indicators. That is, the switches are provided in accordance with the methods of holding the main body, so it is not necessary for the user to move the index finger in order to press the switches.

According to Embodiment 7, it is not necessary to provide indicators such as those of Embodiments 1 to 6; therefore, as compared with a case where, when the ear type clinical thermometer according to Embodiments 1 to 6 is to be manufactured, the indicators are made as separate units from the main body and the switches, the number of parts used for the ear type clinical thermometer and the number of processes needed to produce it are fewer.

Note that in Embodiment 7 the switches $3A_1$ to $3A_3$ have a triangular shape in plane view, as shown in FIG. 10($a$) and FIG. 10($b$); however, it is also possible to construct the switches $3A_1$ to $3A_3$ having a round shape in plane view (i.e., having a semi-spherical shape), as shown in FIG. 10($c$). Also, a switch $3A_4$ corresponding to holding method 1 may be provided on the reference plane F.

EMBODIMENT 8

Figure 11:
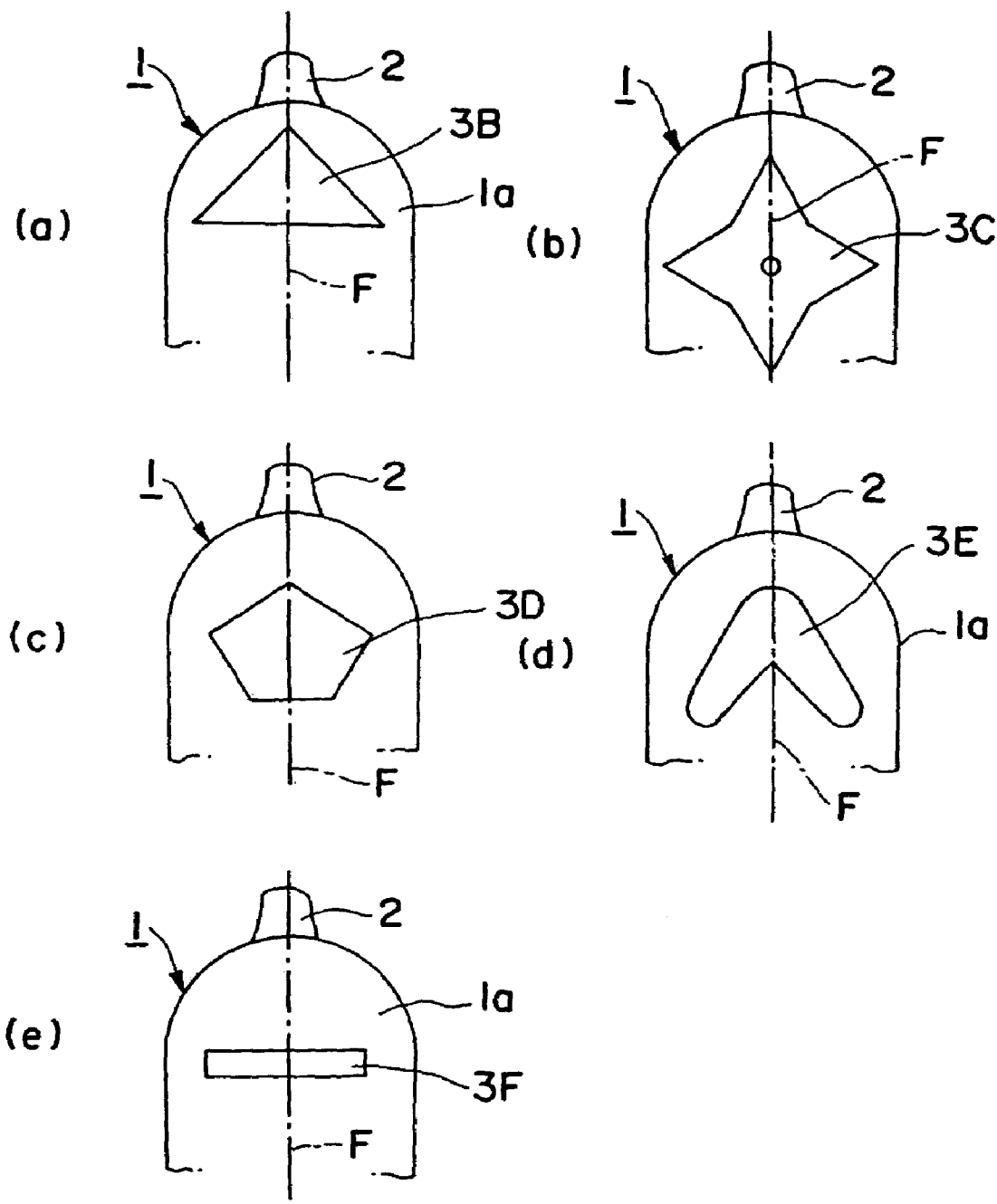
FIG. 11 is a view showing a construction of an ear type clinical thermometer according to Embodiment 8 of the present invention.

FIG. 11($a$) is a frontal view showing a part of the ear type clinical thermometer according to Embodiment 8 of the present invention, and FIGS. 11($b$) to ($e$) are frontal views showing example variations of the ear type clinical thermometer shown in FIG. 11($a$). Embodiment 7 is different from Embodiments 1 to 7 in that a switch for starting the measuring, which is used in common across holding methods 1 to 3, has the function of indicating holding method.

As shown in FIG. 10($a$), the one end of the front side member 1$a$ along its longitudinal direction is provided with a switch 3B which is shaped as an isosceles triangle in its plane view. The switch 3B protrudes from the front side member 1$a$, with the tip thereof that is opposite the base of the triangle being arranged on the reference plane F, and the triangle being substantially symmetrical with respect to the reference plane F.

According to a method for using the ear type clinical thermometer according to Embodiment 8, the user executes holding methods 1 to 3 according to the planar shape of the switch 3B (i.e., according to the corners of the isosceles triangle). That is, in the case when the user is to execute holding method 1, the user determines the placement position of the index finger according to the corner arranged on the reference plane F.

On the other hand, in the case when the user is to execute holding method 2, the user determines the placement position of the index finger according to the corner of the triangle that is on the left side of the reference plane F. On the other hand, in the case when the user is to execute holding method 2, the user determines the placement position of the index finger according to the corner of the triangle that is on the right side of the reference plane F.

As in the case of Embodiment 7, according to Embodiment 8 it is not necessary to provide indicators; therefore, as compared with a case where, when the ear type clinical thermometer according to Embodiments 1 to 6 is to be manufactured, the indicators are made as separate units from the main body and the switches, the number of parts used for the ear type clinical thermometer and the number of processes needed to produce it are fewer.

Note that it is sufficient if the shape of the switch is substantially symmetrical with respect to the reference plane F. However, particularly if a shape is used which has its tip arranged on a straight line being perpendicular to the reference plane F, then holding methods 1 to 3 can be executed by substantially the same method as that in Embodiment 8 shown in FIG. 11(a). For example, as in the case of a switch 3C and a switch 3D shown in FIG. 11(b) and FIG. 11(c), the shape may be star-shaped or pentagon shaped in plane view. The star shape shown in FIG. 11(b) has four corners with an acute angle (i.e., four vertexes); however, the number of acute corners is not limited.

Further, if the shape of the switch is substantially symmetrical with respect to the reference plane F, then it may have a heart or boomerang shape in plane view as shown by switch 3E in FIG. 11(d). It may also be a rectangle in plane view, having its z longer direction going along the shorter direction of the front side member 1a, as shown by switch 3F in FIG. 11(e). Further, as shown in FIG. 11(c), a convex or concave portion may be provided to the center of the switch so that the user can know where the center of the switch is.

EMBODIMENT 9

Figure 12:
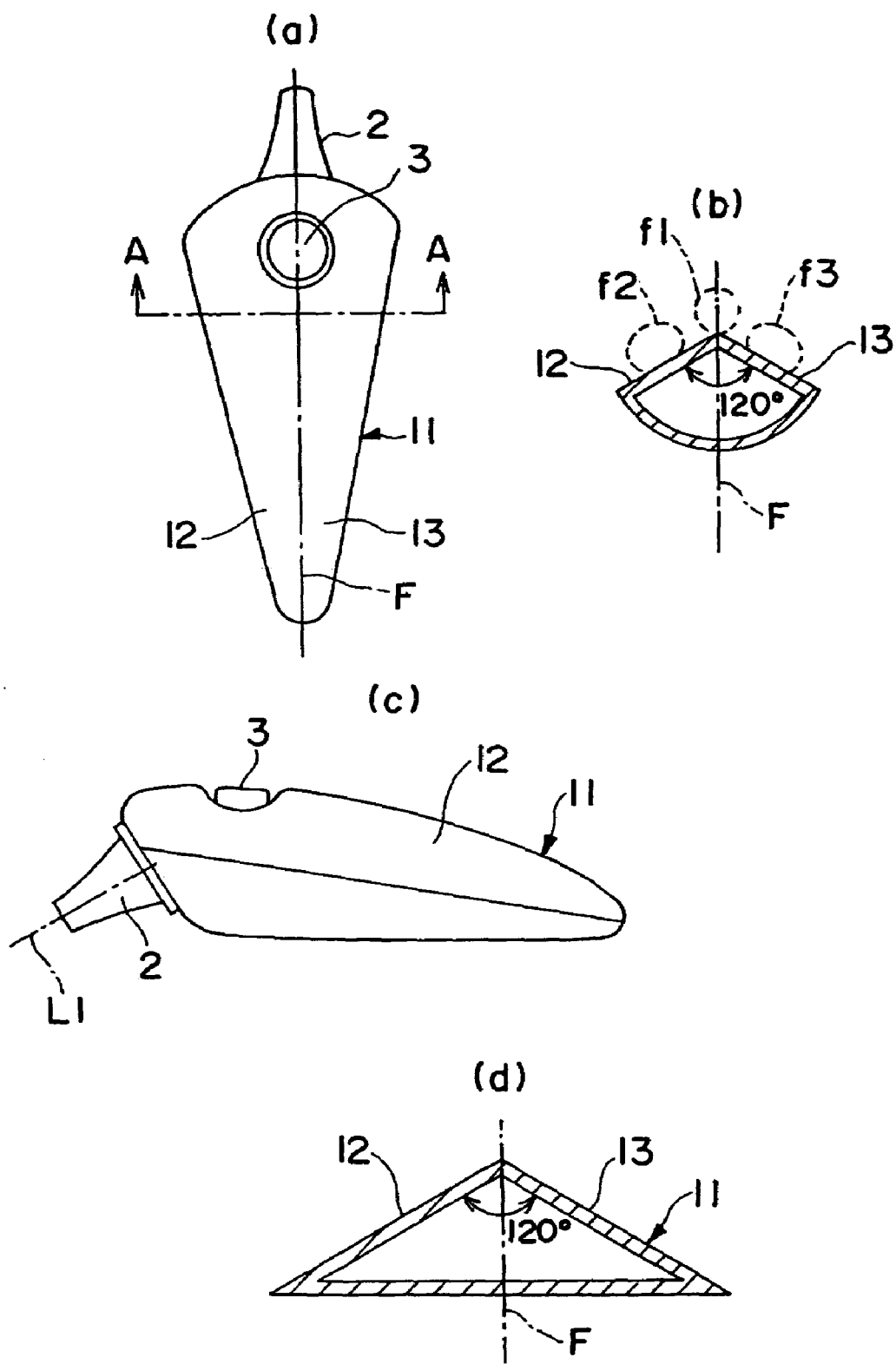
FIG. 12 is a view showing a construction of an ear type clinical thermometer according to Embodiment 9 of the present invention.

FIG. 12(a) is a frontal view of the ear type clinical thermometer according to Embodiment 9 of the present invention, FIG. 12(b) is a end view of the ear type clinical thermometer shown in FIG. 12(a), taken along a line A—A, and FIG. 12(c) is a left side view of the ear type clinical thermometer shown in FIG. 12(a).

Embodiment 9 is different from Embodiments 1 to 8 in that instead of providing the indicators or the switch having the indicator function, a surface (i.e., an indicator surface) is provided to the main body to allow the user to recognize the plurality of main-body-holding methods. Note that Embodiment 9 has a common construction shared with Embodiment 1, so explanation of the portion of common construction is omitted and explanation will be made of the points of difference only.

As shown in FIG. 12(a) and FIG. 12(c), the main body 11 of the ear type clinical thermometer has the longitudinal direction and the shorter direction and its width becomes progressively narrower down the longitudinal direction from the one end towards the other end. The one end along the longitudinal direction of the main body 11 (i.e., the flat surface side of the main body 11) is formed with a surface for providing the probe 2, and the probe 2 is fixed to this surface. The center axis L1 of the probe 2 is arranged on the reference plane F as in Embodiment 1, and the main body 11 is substantially symmetrical with respect to the reference plane F.

On the front side of the main body 11 there are formed a plurality of joined, substantially flat surfaces aligned along the shorter direction of the main body 11 in such a way that neighboring surfaces form an interior angle of 10° to 170°. That is, there are formed an indicator surface 12 and an indicator surface 13 which are substantially flat surfaces and are substantially symmetrical to each other with respect to the reference plane F.

As shown in FIG. 12(b), the indicator surface 12 and the indicator surface 13 are joined along the shorter direction of the main body 11 so as to form an interior angle of 120°. Each of the indicator surfaces 12 and 13 forms a single surface (i.e., a surface having no ridge) running from the one end to the other end along the longitudinal direction of the main body 11.

Further, the front side of the main body 11 is provided with the opening on the one end side along the longitudinal direction of the main body 11, and the start-measuring switch 3 is arranged substantially symmetrically with respect to the reference plane F and exposed from the opening out to the outer surface. On the other hand, the surface shape of the back side of the main body 11 is substantially arc-shaped, as shown in FIG. 12(b).

Note that a location at which the line A—A is drawn is a part where a given part of a finger (ex, the index finger) for pressing the switch 3, which can be anywhere from the tip of the finger to the second knuckle of that finger, will be placed when the main body 11 is being held.

The ear type clinical thermometer according to Embodiment 9 is prepared for the above-mentioned holding methods 1 to 3, as in Embodiment 1. That is, in the case when the user is to execute holding method 1, the user positions the index finger, which is to be the reference for holding the main body 11, along the border (i.e., along the ridge) between the indicator surface 12 and the indicator surface 13 in such a state so as to be able to press the switch 3 (see index finger f1 indicated by broken line in FIG. 12(b)). After that, the user determines the position of the other fingers and the palm and grips the main body 11 according to the positioning of the index finger so that the grip is not unnatural or unsteady. In other words, the user grips the main body 11 naturally according to the positioning of the index finger.

On the other hand, in the case when the user is to execute holding method 2, the user positions the index finger on the indicator surface 12 in such a state as to be able to depress the switch 3 (see index finger f2 indicated by the broken line in FIG. 12(b)), and then the user grips the main body 11 naturally. On the other hand, in the case when the user is to execute holding method 3, the user positions the index finger on the indicator surface 13 in such a state as to be able to depress the switch 3 (see index finger f3 indicated by the broken line in FIG. 12(b)), and then the user grips the main body 11 naturally. Except for this, the method of use of the ear type clinical thermometer according to Embodiment 9 is substantially similar to that of Embodiment 1.

According to Embodiment 9 the indicator surfaces 12 and 13 are provided to the front side of the main body 11, so the user can recognize that there are holding methods 1 to 3 with respect to the main body 11, based on the indicator surfaces 12 and 13 and the border between them, and also can easily execute holding methods 1 to 3 according to the indicator surfaces 12 and 13 and the border between them.

Therefore, it becomes possible to insert the probe 2 at an insertion angle (i.e., direction) which is most appropriate for the person whose temperature is to be measured, and a body temperature can be measured appropriately. Further, the main-body-holding method that is most appropriate for the person to be measured can be easily repeated according to the indicator surfaces 12 and 13.

Note that, as was explained in connection with Embodiment 9, in the ear type clinical thermometer having the indicator surfaces according to the present invention, the indicator surfaces themselves or the border between the indicator surfaces may be used as the reference when the positioning is to be determined for the part of the hand (which is the index finger in this case) which is to be the reference for the holding methods.

Further, it is also possible to use a construction such as is shown in FIG. 12(d), in which the back side of the main body 11 is constructed as a flat surface which is perpendicular to the reference plane F, so that the end face of the main body 11 has a shape of an isosceles triangle when the ear type clinical thermometer shown in FIG. 12(a) is cut along the line A—A.

EMBODIMENT 10

Figure 13:
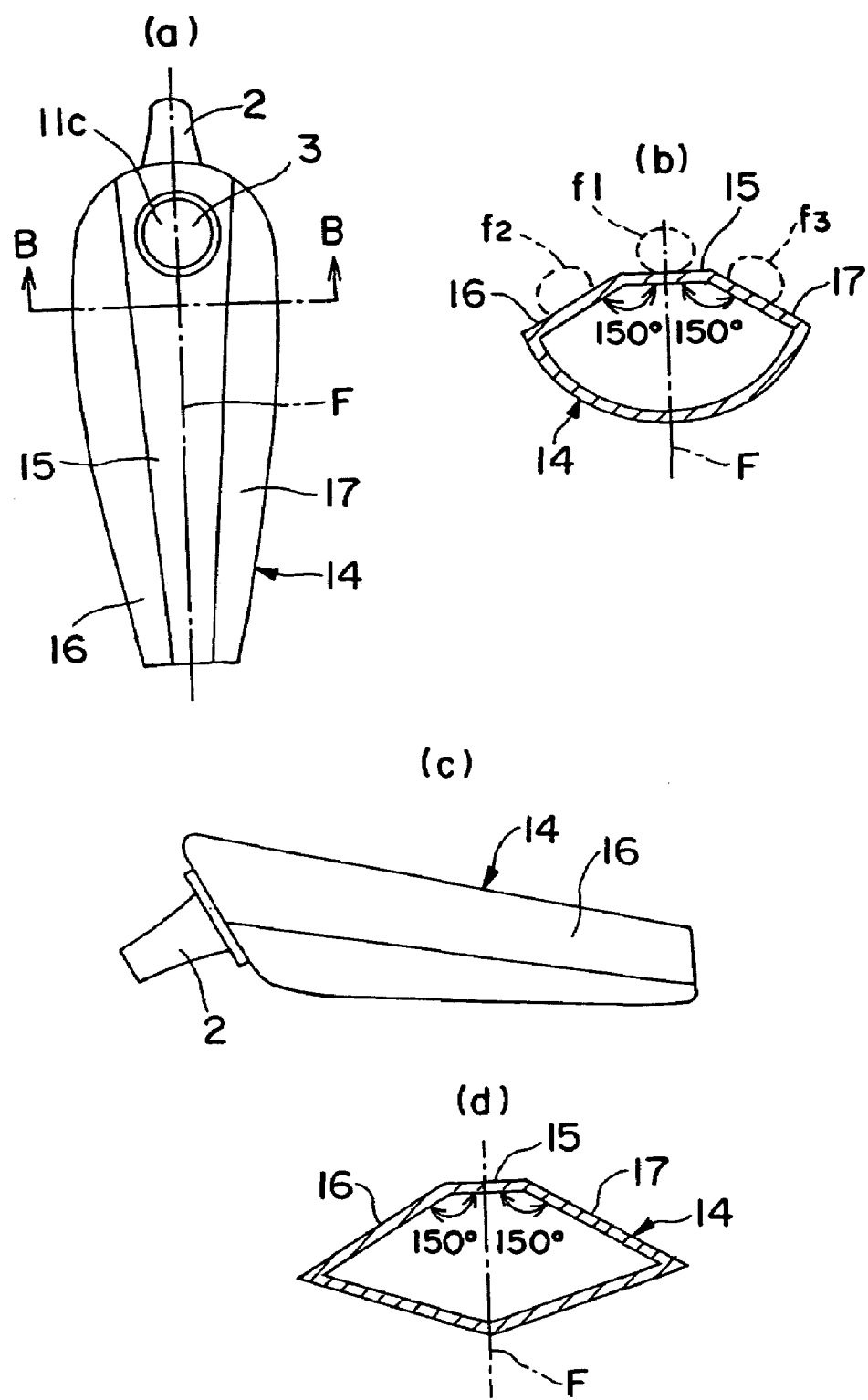
FIG. 13 is a view showing a construction of an ear type clinical thermometer according to Embodiment 10 of the present invention.

FIG. 13(a) is a frontal view of the ear type clinical thermometer according to Embodiment 10 of the present invention, FIG. 13(b) is an end view of the ear type clinical thermometer of FIG. 13(a) taken along a line B—B, and FIG. 13(c) is a left side view of the ear type clinical thermometer shown in FIG. 13(a). Embodiment 10 has a common construction shared with Embodiment 9, so explanation of the portion of common construction is omitted and explanation will be made of the points of difference only.

As shown in FIG. 13(a) and FIG. 13(c), substantially flat indicator surfaces 15 to 17 being substantially symmetrical to each other with respect to the reference plane F are formed on the front side of the main body 11, which are successively aligned along the shorter direction of the main body 11. As shown in FIG. 12(b), the indicator surface 15 is perpendicular to the reference plane F, and the indicator surfaces 16 and 17 are joined to the indicator surface 15 at an interior angle of 150°.

Further, the front side of the main body 11 is provided with the opening on the one end portion along the longitudinal direction of the main body 11, and the start-measuring switch 3 is arranged substantially symmetrically with respect to the reference plane F and exposed from the opening out to the outer surface. On the other hand, the surface shape of the back side of the main body 11 is substantially arc-shaped, as shown in FIG. 13(b).

Note that in FIG. 13(a), a location at which the line B—B is drawn is a part where a given part of a finger (ex, the index finger) for pressing the switch 3, which can be anywhere from the tip of the finger to the second knuckle of the finger, will be placed when the main body 11 is being held.

The ear type clinical thermometer according to Embodiment 10 can be used with the above-mentioned holding methods 1 to 3, as in Embodiment 9. That is, in the case when the user is to execute holding method 1, the user positions the index finger along the central line of along the longitudinal direction of the indicator surface 15 (i.e., along the reference plane F) in such a state so as to able to press the switch 3 (see index finger f1 indicated by broken line in FIG. 13(b)). After that, the user grips the main body 11 naturally according to the positioning of the index finger.

On the other hand, in the case when the user is to execute holding method 2, the user positions the index finger on the indicator surface 16 in such a state as to be able to depress the switch 3 (see index finger f2 indicated by the broken line in FIG. 13(b)), and then the user grips the main body 11 naturally. On the other hand, in the case when the user is to execute holding method 3, the user positions the index finger on the indicator surface 17 in such a state as to be able to depress the switch 3 (see index finger f3 indicated by the broken line in FIG. 13(b)), and then the user grips the main body 11 naturally. Except for this, the method of use of the ear type clinical thermometer according to Embodiment 10 is substantially similar to that of Embodiment 9.

According to Embodiment 10, user can recognize holding methods 1 to 3 based on the indicator surfaces 15 to 17, and also can easily execute holding methods 1 to 3 according to the indicator surfaces 15 to 17.

Further, it is also possible to employ a construction such as is shown in FIG. 13(d), in which the back side of a main body 14 is constructed as a flat surface which is substantially symmetrical with respect to the reference plane F, so that the end face of the main body 14 having the shape of an pentagon can be obtained when the ear type clinical thermometer shown in FIG. 13(a) is cut along the line B—B.

That is, in the ear type clinical thermometer according to Embodiment 9 and Embodiment 10, a construction may be employed in which an end surface taken along the shorter direction of the main body 11 or main body 14 has a polygonal shape.

Note that, with Embodiments 1 to 10, explanations have been made of the ear type clinical thermometer with three possible methods of holding it; however, as long as a plurality of holding methods are possible, there may be provided any number of holding methods.

Further, in Embodiments 1 to 10 the index finger was given as an example of a part of the hand which is to serve as the reference for the grips on the main body of the ear type clinical thermometer; however, in the case when the finger which is to press the start-measuring switch is a finger other than the index finger (such as the middle finger, for example), then the middle finger may be used as the reference to determine the holding method. Also, the part of the hand serving as the reference may be a part which makes contact with the main body and supports the main body when the main body is being held, for example, a thumb, middle finger, ring finger, little finger, palm (especially the thenar), base of the index finger or the middle finger, or the like.

According to the ear type clinical thermometer of the present invention, which is used for measuring the eardrum temperature, it becomes possible to hold the main body in such a way that it is possible to change the angle of the probe in relationship to the external auditory canal, depending on the position of the eardrum of the person whose temperature is to be measured.

INDUSTRIAL APPLICABILITY

According to the above description, in an ear type clinical thermometer according to the present invention it is possible to measure infrared rays emitted from an eardrum using an infrared ray sensor in noncontact way, and an eardrum temperature can be easily measured regardless of the position of the eardrum of the person whose temperature is to be measured.

The invention claimed is:

1. An ear type clinical thermometer, comprising:
a main body configured to be held by hand at a time when an eardrum temperature is to be measured; and
a probe fixed to and protruding from the main body and configured to be inserted into an external auditory canal of a person whose eardrum temperature is to be measured wherein:
the main body comprises at least one indicator for allowing a user to recognize and use a plurality of methods for holding the main body, the plurality of different methods differ from each other according to the direction in which the probe is to be inserted into the external auditory canal of the person whose temperature is to be measured, and
comprising a switch for starting the measuring of the eardrum temperature, which is used across a plurality of main-body-holding methods, wherein the indicator is provided on a surface of the switch.

2. An ear type clinical thermometer according to claim 1, wherein the indicator is configured to allow the user to recognize and use a plurality of methods for holding the main body when the direction in which the probe is to be inserted is a direction going from an opening of the external auditory canal toward the back side of the head of the person whose temperature is to be measured, and a main-body holding method used in a case when the direction in which the probe is to be inserted is a direction going from the opening of the external auditory canal to a front side of the head of person whose temperature is to be measured.

3. An ear type clinical thermometer, comprising
a main body configured to be held by hand at a time when an eardrum temperature is to be measured; and a probe fixed to and protruding from the main body and configured to be inserted into an external auditory canal of a person whose eardrum temperature is to be measured wherein the main body comprises an indicator surface member provided to the main body and configured to allow a user to recognize and use a plurality of methods for holding the main body, the plurality of different methods differ from each other according to the direction in which the probe is to be inserted into the external auditory canal of the person whose temperature is to be measured,
wherein the indicator surface member comprises a plurality of surfaces arranged substantially symmetrically with respect to a reference plane containing a center axis of the probe.

4. An ear type clinical thermometer, comprising:
a main body configured to be held by hand at a time when an eardrum temperature is to be measured; and a probe fixed to and protruding from the main body and configured to be inserted into an external auditory canal of a person whose eardrum temperature is to be measured wherein the main body comprises an indicator surface member configured to allow a user to recognize and use a plurality of methods for holding the main body, the plurality of different methods differ from each other according to the direction in which the probe is to be inserted into the external auditory canal of the person whose temperature is to be measured,
wherein the indicator surface member comprises a plurality of surfaces arranged substantially symmetrically with respect to a reference plane containing a center axis of the probe and the indicator surface comprises a plurality of substantially flat surfaces that are aligned along a direction that is perpendicular to the reference plane and are joined in such a way that neighboring substantially flat surfaces form interior angles of 10° to 170°.

5. An ear type clinical thermometer according to claim 3, wherein:
the main body has a first side where the probe protrudes from the main body and a second side opposite to the first side and from which the user holds the main body, the second side forming a curved surface having a substantially constant curvature along a direction perpendicular to a reference plane containing a center axis of the probe, a center of curvature of this curved surface being located in the vicinity of a base and end of the probe.

* * * * *